United States Patent

Schroth et al.

[11] Patent Number: 5,805,107
[45] Date of Patent: Sep. 8, 1998

[54] COST-EFFECTIVE METHOD FOR DETERMINING A PULSE RESPONSE OF A HIGH-RESOLUTION, BAND-LIMITED RADAR CHANNEL

[75] Inventors: Arno Schroth, Puchheim; Tobias Felhauer, Neu-Ulm; Walter Baier, Kaiserslautern, all of Germany

[73] Assignee: Deutsche Forschungsanstalt fur Luft-Und Raumfahrt e.V., Köln, Germany

[21] Appl. No.: 837,602

[22] Filed: Apr. 18, 1997

[30] Foreign Application Priority Data

Apr. 18, 1996 [DE] Germany .................. 196 15 353.0

[51] Int. Cl.$^6$ .................................................. G01S 7/292
[52] U.S. Cl. .................. 342/189; 342/194; 342/195; 342/196; 342/205; 342/159; 342/162; 342/203
[58] Field of Search ................ 342/189, 29, 33, 342/36, 39, 59, 93, 148, 159, 162, 194, 195, 203, 196, 205, 201, 202

[56] References Cited

U.S. PATENT DOCUMENTS

| 4,454,510 | 6/1984 | Crow ............................ 342/455 X |
| 5,173,706 | 12/1992 | Urkowitz ............................ 342/99 |
| 5,247,303 | 9/1993 | Cornelius et al. ............................ 342/26 |
| 5,448,243 | 9/1995 | Bethke et al. ............................ 342/59 |

FOREIGN PATENT DOCUMENTS

| 4231311 | 3/1994 | Germany . |
| 403245082A | 10/1991 | Japan . |
| 409005431A | 1/1997 | Japan . |
| 2259210 | 3/1993 | United Kingdom . |

OTHER PUBLICATIONS

Felhauer et al., "Otimum Estimation, A Favourable Alternative to Correlation Methods in Radar Systems Using Expanded Waveforms", AEU, vol. 46, No. 1, pp. 32–37, 1992.

Primary Examiner—John B. Sotomayor
Attorney, Agent, or Firm—Browdy and Neimark

[57] ABSTRACT

For less expensive estimation the impulse response $\hat{x}_{MOS}$ of a high-resolution, band-limited radar channel in a radar station operating with an expanded transmitted pulse $\underline{a}(t)$, from a received signal $\underline{e}$, over which a correlated or uncorrelated additive interference signal $\underline{n}$ can be superimposed, with the use of knowledge about the spread code $\underline{c}$ and the use of a channel estimator with which a so-called linear, optimum unbiased estimation of the radar channel impulse response $\underline{x}_{MOS}$ is performed in a time range covering M range gates of interest, the linear, optimum estimation in the unbiased channel estimator is modified in such a way that the pulse response $\underline{x}_{MOS}$ of the band-limited radar channel is determined according to the basic principle of a multiplication of the sampled received signal $\underline{e}$ and an inverse estimation matrix $\underline{A}_E^{-1}$. The matrix $\underline{A}_E$ is formed by the extension of the rectangular matrix represented by the components $c_i$ of the spread code $\underline{c}$ to form a quadratic matrix that circulates to the right, that is, the modified, optimum unbiased estimation:

$$\hat{x}_{MOS} = \underline{A}_E^{-1} \underline{e}$$

applies for a radar channel.

19 Claims, 12 Drawing Sheets

FIG. 4(a)
(PRIOR ART)

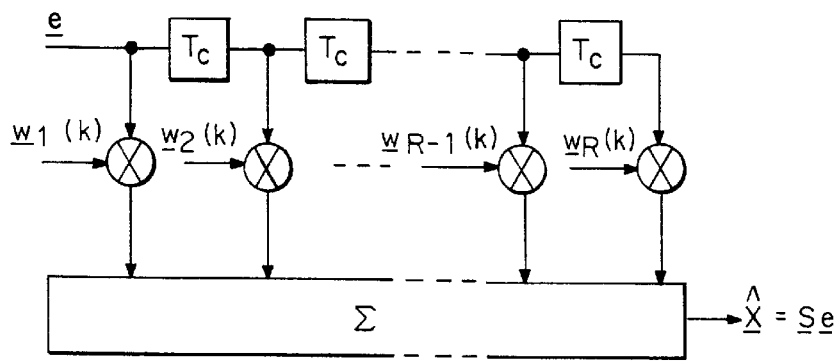

FIG. 4(b)
(PRIOR ART)

|   | $\underline{w}_1(k)$ | $\underline{w}_2(k)$ | --- | $\underline{w}_M(k)$ | --- | $\underline{w}_{M+N-1}(k)$ | $\underline{w}_{M+N}(k)$ | $\underline{w}_{M+N+1}(k)$ | --- | $\underline{w}_{2M+N-1}(k)$ |
|---|---|---|---|---|---|---|---|---|---|---|
| k=1 | $\underline{S}_{1,1}$ | $\underline{S}_{1,2}$ | --- | $\underline{S}_{1,M}$ | --- | $\underline{S}_{1,M+N-1}$ | 0 | 0 | --- | 0 |
| k=2 | 0 | $\underline{S}_{2,1}$ | --- | $\underline{S}_{2,M-1}$ | --- | $\underline{S}_{2,M+N-2}$ | $\underline{S}_{2,M+N-1}$ | 0 | --- | 0 |
| ⋮ |   |   |   |   |   |   |   |   |   |   |
| k=M | 0 | 0 | --- | $\underline{S}_{M,1}$ | --- | $\underline{S}_{M,N}$ | $\underline{S}_{M,N+1}$ | $\underline{S}_{M,N+2}$ | --- | $\underline{S}_{M,M+N-1}$ |

FIG. 5

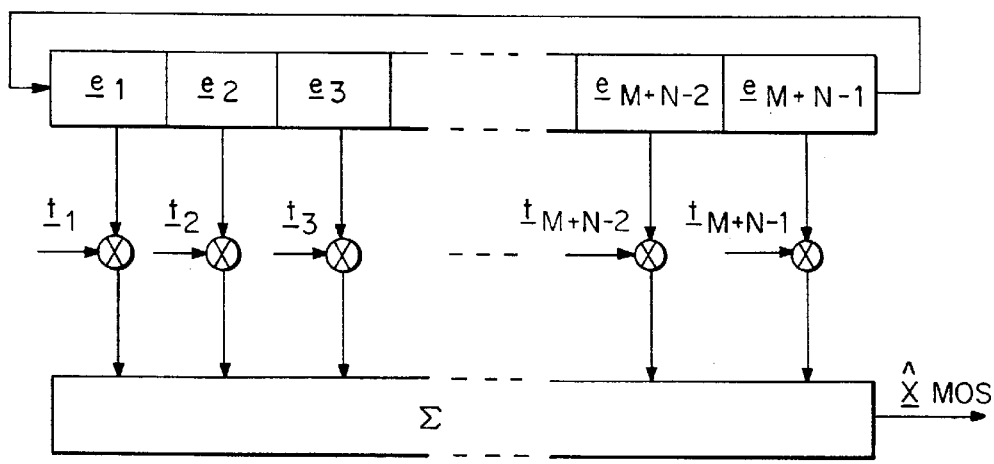

FIG. 8(a)

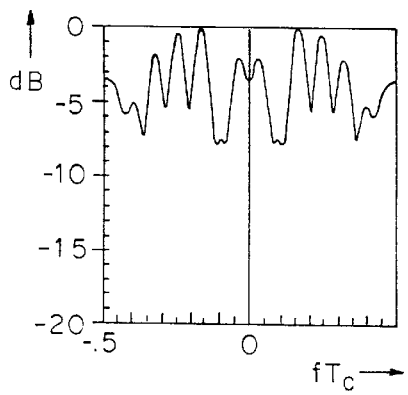

CODE LENGTH : N = 16

MEASURE OF EFFECTIVENESS:
$d_{OS}$ = 1,02 dB
$d_{MOS}$ = 1,04 dB
PSR = 18,10 dB

HEXADECIMAL REPRESENTATION:
2 8 3 3

FIG. 8(b)

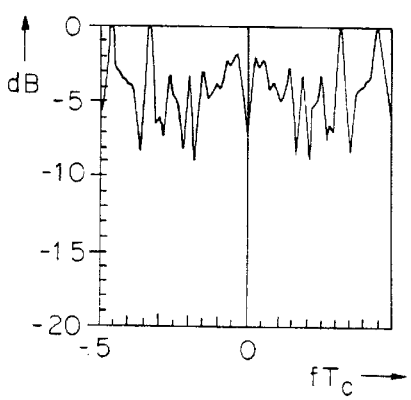

CODE LENGTH : N = 32

MEASURE OF EFFECTIVENESS:
$d_{OS}$ = 0,94 dB
$d_{MOS}$ = 0,96 dB
PSR = 18,06 dB

HEXADECIMAL REPRESENTATION:
0 0 F 2 D 5 6 6

FIG. 8(c)

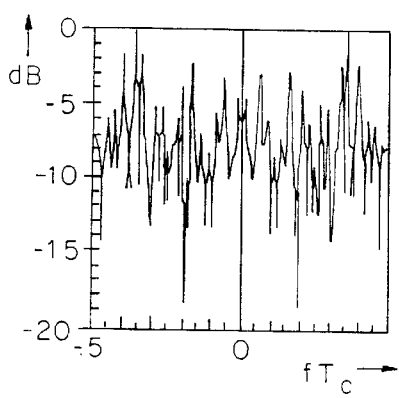

CODE LENGTH : N = 64

MEASURE OF EFFECTIVENESS:
$d_{OS}$ = 2,13 dB
$d_{MOS}$ = 2,22 dB
PSR = 18,06 dB

HEXADECIMAL REPRESENTATION:
4 8 4 3 B A B 4 E F 8 6 D E 4 B

CONVERSION OF HEXADECIMAL → BINARY REPRESENTATION, e.g.

```
N = 16         2      8      3      3
BINARY      0010   1000   0011   0011
CODE:       --+-   +---   --++   --++
```

COST-EFFECTIVE METHOD FOR DETERMINING A PULSE RESPONSE OF A HIGH-RESOLUTION, BAND-LIMITED RADAR CHANNEL

FIELD OF THE INVENTION

The invention relates to a cost-effective method for determining a pulse response of a high-resolution, band-limited radar channel.

DESCRIPTION OF THE RELATED TECHNOLOGY

DE 41 43 215 A1 describes a near-range radar (NR) network comprising a non-cooperative, modular locating system whose fundamental system structure is illustrated in FIG. 1. In FIG. 1 the NR network has N modules respectively formed by four radar stations $R_i$ (i=1 . . . 4). Stationary, that is, non-rotating, antennas are installed in the individual radar stations so as to minimize reflections and shadowing from buildings. The stationary antennas, which together illuminate a control region K, have an extremely large horizontal apex angle.

To simultaneously achieve a range of up to 1.5 km and a range resolution of 2 to 3 m with a low transmitting power of approximately 1 W, pulse-compression signals, that is, temporally-expanded pulses, are used which have a time-bandwidth product much larger than one due to a differentiated fine structure. The use of fixed antennas and a low transmitting power permits a cost-effective, low-maintenance embodiment of the individual radar stations $R_i$.

So that the individual radar stations $R_i$ of a module or radar stations of different modules do not mutually interfere with one another, the individual radar stations of the entire NR network transmit temporally independently. Moreover, all of the radar stations transmit in the same frequency band, preferably the X-band, at a measuring repetition frequency of 100 Hz. The measured data of the individual measuring stations $R_i$ are collected by a modular computer and further processed.

Using one-dimensional echo profiles measured by the individual radar stations, the modular computer calculates the positions of moving objects in the control region to be monitored. Because only radial distances are measured, the location of an object follows from the point of intersection of circular arcs intersecting around the radar stations $R_i$ (FIG. 1).

For monitoring large airport regions, a several modules are used whose modular computers are again connected to a central network computer. The network computer controls, coordinates and synchronizes the individual modules and collects the resulting data and provides them further to the higher-ordered SMGC (Surface Movement Guidance and Control) planning system.

Because the NR network described in DE 41 43 215 A1 must be used to detect smaller objects located next to very large objects, a relative dynamic range of 50 dB is necessary within an echo profile; however, due to unavoidable correlation sidelobes, such a dynamic range is unattainable with binary phase-coded, expanded transmitted pulses having a maximum time-bandwidth product of 64 in the transmitter, and with matched filtering in the receiver. In the concept of signal processing at the receiver pursued up to now in the NR network, the Applicant has used as a basis complementary binary codes that are processed in the receiver with a matched filter system.

The special correlation property of complementary codes is utilized here; complementary codes are code pairs constructed such that, in pair-wise, linear superposition of the auto-correlation functions, the correlation sidelobes mutually cancel each other out. In a real system, the individual codes forming a complementary code pair are transmitted consecutively and supplied to corresponding, matched filters in the receiver. The desired compensation of the correlation sidelobes can be achieved through inphase linear superposition of the signals at the output of the matched filters.

In real systems, however, it is known that problems arise in receivers that operate with signal-matched filtering if, on the one hand, the initial phases of the echo signals are not known exactly in the receiver, as in radar systems, and, on the other hand, Doppler shifts occur. In these cases, compensation of correlation sidelobes is not adequately effective for this application.

As an alternative to the receiver concept pursued up to this point, the basic principle of a receiver concept described here is known (T. Felhauer, P. Voigt, P. W. Baier and A M ämmelä, "Die Optimalschätzung als vorteilhafte Alternative zur Korrelation in Radarsystemen mit expandierten Impulsen [Optimum Estimation as an Alternative to Correlation in Radar Systems Using Expanded Pulses]," "AE Ü" Magazine, Vol. 46 (1992), No. 1, pp. 32–38), but can be implemented, in modified form, very cost-effectively and efficiently taking into consideration the special marginal conditions for the considered application. The basic principle of this receiver concept is the first topic discussed below.

First, only the system components relevant for algorithms for optimum receiver-side signal processing that is unbiased with respect to the principle structure of a radar station $R_i$ (i=1, . . . , 4) are described; band-pass signals $S_{BP}(t)$, whose bandwidth is much smaller than the carrier frequency $f_0$, are represented by their complex low-pass equivalent $\underline{s}_{TP}(t)$, $$s_{BP}(t) = Re\ [\underline{s}_{TP}(t)e^{j2\pi f_0 t}]. \tag{1}$$

Complex variables are indicated by underlining, while matrices and vectors are shown in bold type. The symbols $(.)^*$ and $(.)^T$ indicate complex-conjugated and transponded, respectively.

FIG. 2 shows the basic structure of such a system, which comprises a radar transmitter 1, a radar channel 2, an adder 4 for feeding in an interference signal, and a radar receiver 3. A binary phase-coded expanded transmitted pulse is digitally generated in the radar transmitter in that the binary code elements $c_i \in [-1, +1]$ of the binary code $$\underline{c} = (\underline{c}_1, \underline{c}_2, \ldots \underline{c}_N)^T \tag{2}$$

of length N are read out of a digital memory 10 at temporal intervals $T_c$ (chip duration) and supplied to a transmitting filter 11 having the impulse response $\underline{h}_s(t)$. The analog, binary phase-coded, expanded pulse $$\underline{a}(t) = \sum_{k=1}^{N} c_k \underline{h}_s(t - kT_c) \tag{3}$$

is subsequently transmitted to the radar channel 2, which is formed by the free space between the transmitter output and the receiver input and the back-scattering objects present therein. The overall transmission behavior of the radar channel 2 can be described by its channel impulse response $\underline{h}(\tau)$. The signal $$r(t) = \int_{-\infty}^{+\infty} \underline{a}(t-\tau)\underline{h}(\tau)d\tau + \underline{n}_e(t) \tag{4}$$

at the receiver input, over which the additive noise $\underline{n}_e(t)$ is superimposed, is supplied to a receiving filter 30 having the impulse response $\underline{h}_c(t)$. In accordance with Eq. (7), the signal $\underline{e}(t)$ at the input of a channel estimator 31 is calculated according to FIG. 1 using $$\underline{x}(\tau) = \underline{h}_s(\tau) * \underline{h}(\tau) * \underline{h}_c(\tau) \tag{5}$$

and $$\underline{n}(t) = \underline{n}_e(t) * \underline{h}_c(\tau), \tag{6}$$

where the symbol "*" stands for convolution:

$$\underline{e}(t) = \sum_{i=1}^{N} c_i \cdot \underline{x}(t - iT_c) + \underline{n}(t). \tag{7}$$

With the channel estimator 31 in FIG. 2, the most precise possible estimation of the impulse response of the radar channel 2 can be determined from the received signal $\underline{e}(t)$ in accordance with Eq. (7) and by using some type of a priori knowledge. Because the radar channel impulse response is determined by the reflecting objects within the radar channel, the desired information about location, speed and type of the reflecting objects in the radar channel 2 can be determined through evaluation of the estimated radar channel impulse response.

In principle, however, only an estimate $\hat{\underline{x}}(\tau)$ of a function $\underline{x}(\tau)$, referred to hereinafter as the measurable channel impulse response, can be determined in accordance with Eq. (5). Regardless of the applied receiver-side signal processing in the channel estimator 31, the transmitting filter 11 and the receiving filter 30 must therefore be correspondingly selected so that information about the reflected objects in the radar channel 2 can be obtained in a simple manner from the measurable channel pulse response $\underline{x}(\tau)$.

The received signal $\underline{e}(t)$ in accordance with Eq. (7) is fed in a channel estimator 31 having digital signal processing according to FIG. 3. Because only M range gates are of interest here, the measurable channel pulse response is only evaluated within a time interval $$0 \leq \tau \leq (M-1)T_c. \tag{8}$$

For an expanded transmitted pulse $\underline{a}(t)$ in accordance with Eq. (3) and having a duration $NT_c$, the received signal $\underline{e}(t)$ is only influenced by the relevant range of the measurable channel pulse response $\underline{x}(\tau)$ within the time interval $$0 \leq t \leq (M+N-1)T_c. \tag{9}$$

With a vector $$\underline{n} = (\underline{n}_1, \underline{n}_2, \ldots, \underline{n}_{M+N-1})^T \tag{10}$$

of the samples $\underline{n}_i$ of the noise $\underline{n}(t)$, which is additively superimposed over the received signal $\underline{e}(t)$ according to Eq. (7) during the time interval of Eq. (9), and the vector $$\underline{x} = (\underline{x}_1, \underline{x}_2, \ldots, \underline{x}_M)^T \tag{11}$$

of the samples of the measurable channel pulse response $\underline{x}(\tau)$ in accordance with Eq. (5) in the time interval according to Eq. (8), it follows for the samples $\underline{e}_i$ of the received signal $\underline{e}(t)$ in accordance with Eq. (7) that $$\underline{e} = \begin{bmatrix} \underline{e}_1 \\ \underline{e}_2 \\ \vdots \\ \vdots \\ \underline{e}_{M+N-1} \end{bmatrix} = \begin{bmatrix} \underline{c}_1 & 0 & \cdots & 0 \\ \underline{c}_2 & \underline{c}_1 & & \vdots \\ \vdots & \underline{c}_2 & & 0 \\ \vdots & & & \\ \underline{c}_N & \cdots & & \underline{c}_1 \\ 0 & \underline{c}_N & & \underline{c}_2 \\ \vdots & & & \vdots \\ 0 & \cdots & 0 & \underline{c}_N \end{bmatrix} \begin{bmatrix} \underline{x}_1 \\ \underline{x}_2 \\ \vdots \\ \vdots \\ \underline{x}_M \end{bmatrix} + \begin{bmatrix} \underline{n}_1 \\ \underline{n}_2 \\ \vdots \\ \vdots \\ \underline{n}_{M+N-1} \end{bmatrix} = \underline{A}\underline{x} + \underline{n} \tag{12}$$

within the time interval according to Eq. (9). In accordance with Eq. (12), therefore, in principle only samples $\underline{x}_i$ of the measurable channel pulse response $\underline{x}(\tau)$ can be determined with a channel estimator 31 having digital signal processing. A necessary requirement for a relative dynamic range of 40 to 50 dB, regardless of the type of receiver-side signal processing for channel estimation, is therefore a function of the selection of the transmitting and receiving filters 11 and 30, respectively.

With respect of simplicity, the binary code c according to Eq. (2) stored in the transmitter 1 is characterized as an expanded transmitted pulse, the vector $\underline{x}$ according to Eq. (11) as a channel pulse response, and its components $\underline{x}_i$ with ($i=1 \ldots M$) as potential reflectivities, the vector $\underline{n}$ according to Eq. (10) as additive noise, and the vector $\underline{e}$ according to Eq. (12) as a received signal.

The most widely used technique of digital signal processing in the receiver of expanded pulses is correlation based on matched filtering. In this type of receiver-side signal processing, the received signal $\underline{e}$ according to Eq. (12) is correlated with the time-inverse, complex-conjugated, expanded transmitted pulse $\underline{c}$ according to Eq. (2). With the matrix-vector notation used here, the estimation $\hat{\underline{x}}_{MF}$ of the channel pulse response $\underline{x}$ is obtained at the output of a matched filter (matched filter) in that the received signal $\underline{e}$ according to Eq. (12) is multiplied by the matrix $\underline{A}^{*T}$, that is, $$\hat{\underline{x}}_{MF} = \underline{A}^{*T}\underline{e} = \underline{A}^{*T}\underline{A}\,\underline{x} + \underline{A}^{*T}\underline{n}. \tag{13}$$

When an expanded transmitted pulse reaches a matched filter, the auto-correlation function of the transmitted pulse is obtained at the filter input, which function comprises the main-peak of the correlation, also called compressed pulse, and smaller secondary correlation maxima (correlation sidelobes).

If, however, matched filtering is used in a multi path scenario, which may involve closely-arranged targets having widely-varying backscatter cross sections, the correlation sidelobes at the filter output that are unavoidable in matched filtering are extremely disturbing, because they mask main correlation peaks due to smaller targets (→detection loss), or main correlation peaks of non-existent targets can deceive (→false alarm).

The obvious problem of secondary maxima that also arises in the use of special, expanded pulses with matched filtering can basically be solved with the aid of unbiased estimation algorithms, because systematic estimation errors comparable to the correlation sidelobes can be avoided in advance with estimation algorithms because they are unbiased.

For an optimum estimation matrix $\hat{\underline{x}}_{OS}$ that is unbiased, the received signal $\underline{e}$ according to Eq. (12) is multiplied by the estimation matrix $\underline{S}$ equals $(\underline{A}^{*T}\underline{A})^{-1}\underline{A}^{*T}$, that is, $$\hat{\underline{x}}_{OS} = \underline{S}\ \underline{e} = (\underline{A}^{*T}\underline{A})^{-1}\underline{A}^{*T}\underline{e} = \underline{x} + (\underline{A}^{*T}\underline{A})^{-1}\underline{A}^{*T}\underline{n}. \tag{14}$$

Because it is unbiased, the estimation $\hat{\underline{x}}_{OS}$ according to Eq. (14) is identical to the true channel pulse response $\underline{x}$ up to the additive noise component $(\underline{A}^{*T}\underline{A})^{-1}\underline{A}^{*T}\underline{n}$, in contrast to the estimation $\hat{\underline{x}}_{MF}$ according to Eq. (13). Moreover, the channel estimation $\hat{\underline{x}}_{OS}$ according to Eq. (14) is an optimum unbiased channel estimation, because

- with uncorrelated noise $\underline{n}$, it is the channel estimate in which the variances $E[|\hat{x}_{OSi} - x_i|^2]$ of the unbiased estimation values $\hat{x}_{OSi}$ are minimal,
- with white Gaussian noise, it maximizes the likelihood function $p(\underline{e}|\underline{x})$, and
- after filtering with the expanded transmitted pulse $\underline{c}$ known in the receiver and in accordance with Eq. (2), it approximates the received signal $\underline{e}$ according to Eq. (12) in the sense of least squared errors.

An optimum unbiased channel estimator is characterized in its entirety by the estimation matrix $\underline{S}$ according to Eq. (14). Although the matrix elements $\underline{S}_{ij}$, which are largest in terms of amount, are typically concentrated in a band of width N around the primary diagonals of the estimation matrix $\underline{S}$, with a dynamic range requirement of 40 to 50 dB, the matrix elements $\underline{S}_{ij}$ that are small in terms of amount are not disregarded outside of this band.

The multiplication $\underline{S}\ \underline{e}$ of the received signal $\underline{e}$ according to Eq. (12) and the completely-occupied estimation matrix $\underline{S}$ according to Eq. (14), which is to be performed in optimum unbiased channel estimation, as shown in FIG. 4(a) and 4(b), can be performed through filtering of the received signal $\underline{e}$ according to Eq. (12) with a digital correlator with R equals 2M+N−1 time-varying filtering coefficients $\underline{w}_i(k)$ (i=1, 2, . . . , 2M+N−1; k=1 . . . M).

In accordance with equations (12) and (14), the estimation matrix $\underline{S}$ of an optimum unbiased channel estimator is determined exclusively by the expanded transmitted pulse $\underline{c}$ according to Eq. (2). Because the expanded transmitted pulse $\underline{c}$ is known in the receiver 3, the estimation matrix $\underline{S}$ can theoretically be calculated a priori offline and stored in the receiver 3.

To determine the effectively-transmitted pulse, calibration measurements are taken at relatively short time intervals. Consequently, in practice the estimation matrix $\underline{S}$ is also to be re-created at relatively short intervals. The inversion of the matrix $\underline{A}^{*T}\underline{A}$ to be performed in accordance with Eq. (14) is, however, highly computation-intensive, even if used in cost-effective methods.

OBJECTS AND SUMMARY OF THE INVENTION

Accordingly, the present invention has an object, among others, to overcome deficiencies in the prior art such as noted above.

It is therefore the object of the invention to provide a method of continued high-resolution unbiased channel estimation for radar stations of a modular near range radar (NR) network using spread spectrum signals or expanded pulses, and that is based on optimum unbiased channel estimation, but, because of special marginal conditions, such as in the NR network, can be implemented particularly cost-effectively in a somewhat modified form and with specially-optimized transmitted pulses.

In accordance with the invention, the use of a modified optimum unbiased estimation effects a cost-effective embodiment of a digital signal processing that meets the strenuous real-time conditions, with an estimation matrix that is far less complicated to calculate, in, for example, an NR network. Thus, with respect to signal processing, an optimum method is created for determining an impulse response of a radar channel having high resolution in the radar stations of, for example, a modular NR network.

BRIEF DESCRIPTION OF THE DRAWING

The invention is described in detail below by way of preferred embodiments, with reference to the drawings, wherein:

FIG. 4(a) is a block diagram of a digital correlator for implementing optimum unbiased channel estimation;

FIG. 4(b) is a table;

FIG. 5 is a block diagram of a preferred embodiment of a cyclical correlator for implementing a modified channel estimation in accordance with the invention that meets expectations;

FIGS. 8(a) to 8(c) are curves of optimization results for different code lengths N;

DETAILED DESCRIPTION OF THE PREFERRED EMBODIMENT

Figure 1:
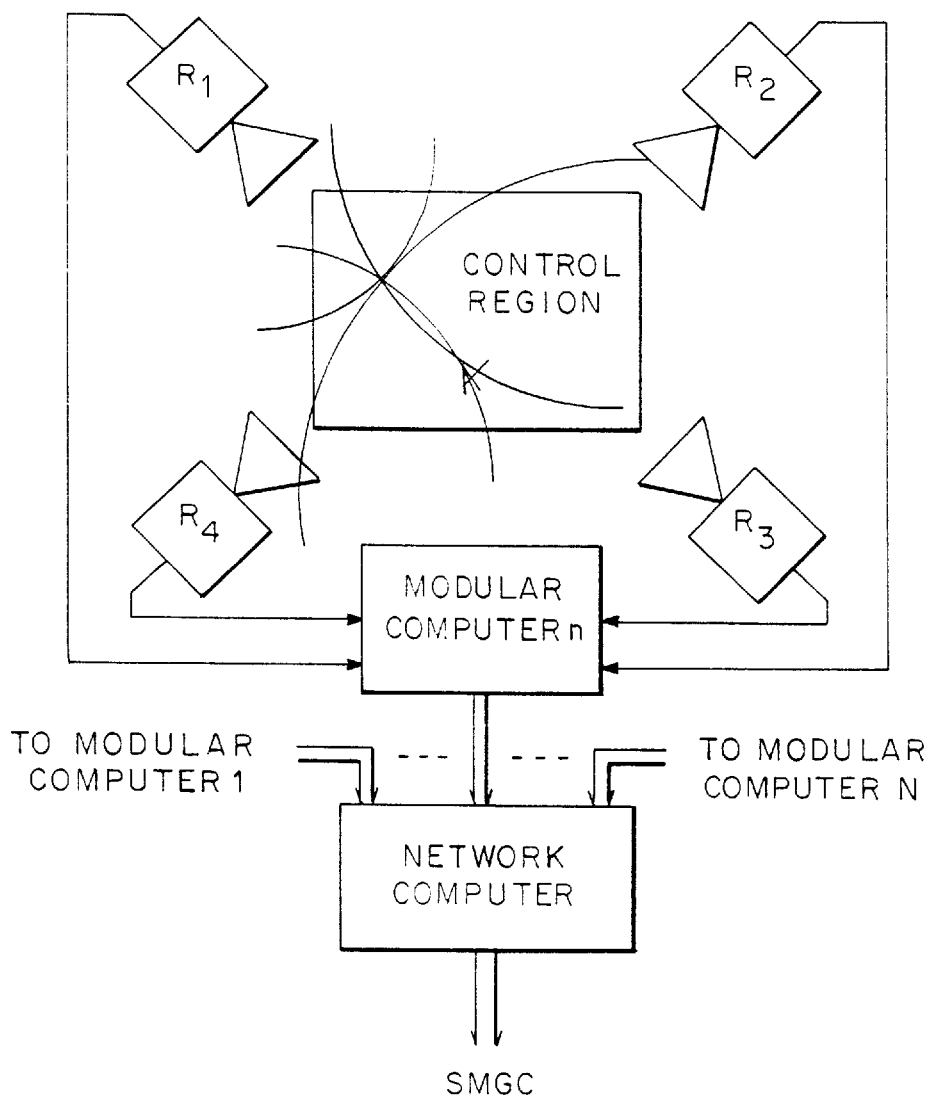
FIG. 1 is a schematic view of a basic structure of a near-range radar network.
Figure 2:
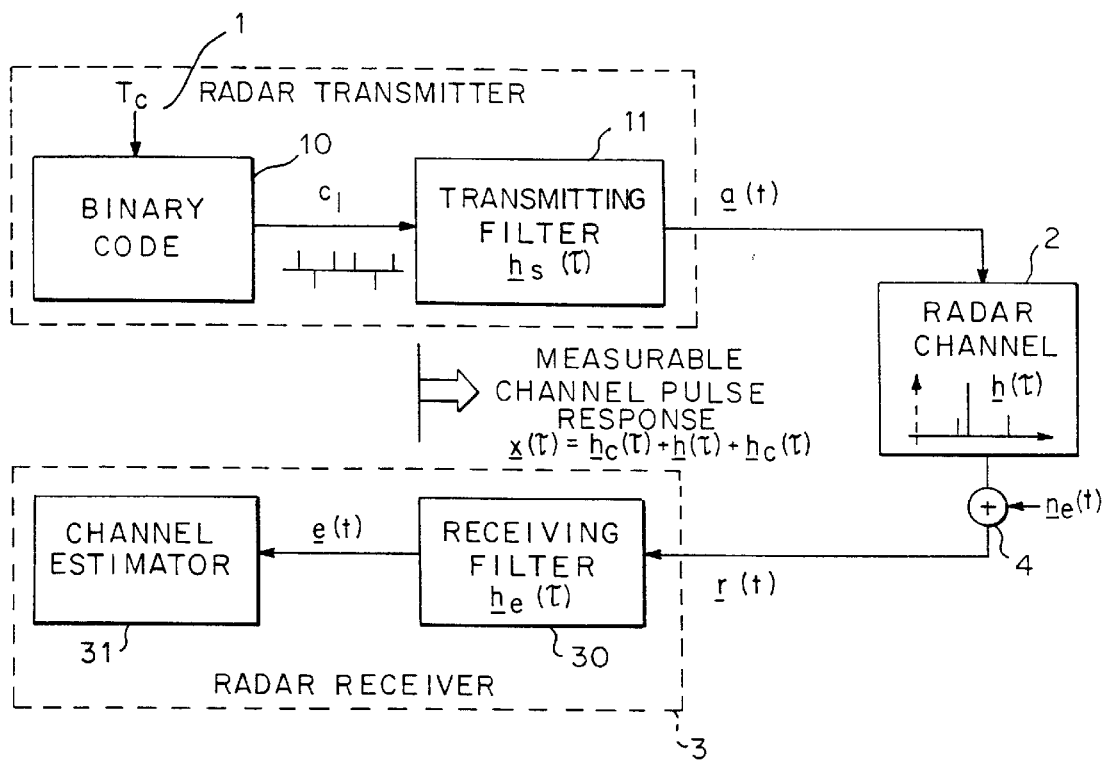
FIG. 2 is a schematic view of a of a known model of a radar station $R_i$.
Figure 3:
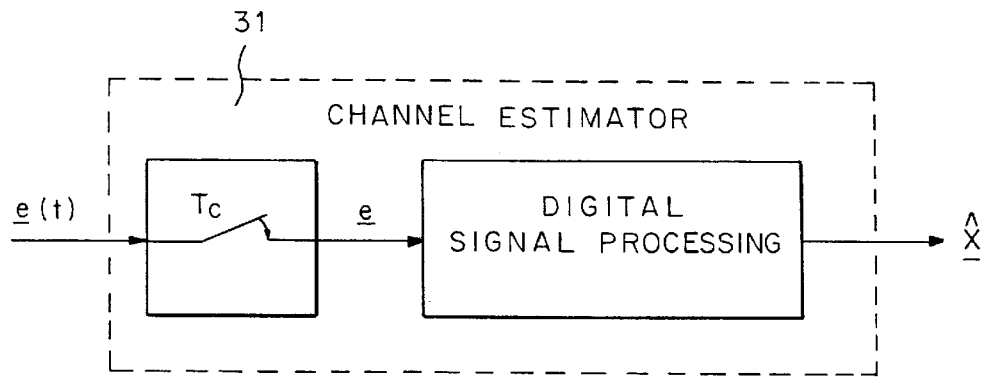
FIG. 3 is a block diagram of a channel estimator using digital signal processing.

A modified algorithm for cost-effective unbiased channel estimation is now described in detail. It is known that a matrix $\underline{B}$ can be inverted in a particularly cost-effective manner if the matrix $\underline{B}$ is of right hand circular type, that is, if the following applies:

$$\underline{B} = \begin{bmatrix} \underline{b}_1 & \underline{b}_2 & \underline{b}_3 & \dots & \underline{b}_{N-1} & \underline{b}_N \\ \underline{b}_N & \underline{b}_1 & \underline{b}_2 & \dots & \underline{b}_{N-2} & \underline{b}_{N-1} \\ \cdot & & & & & \cdot \\ \cdot & & & & & \cdot \\ \cdot & & & & & \cdot \\ \underline{b}_2 & \underline{b}_3 & \underline{b}_4 & \dots & \underline{b}_N & \underline{b}_1 \end{bmatrix} \quad (15)$$

If the matrix $\underline{A}$ of the dimension (M+N−1)×M in Eq. (12) is expanded to the quadratic right hand circular matrix $\underline{A}_E$ $$\underline{A}_E = \begin{bmatrix} \underline{c}_1 & 0 & . & . & 0 & \underline{c}_N & . & \underline{c}_3 & \underline{c}_2 \\ \underline{c}_2 & \underline{c}_1 & & & . & 0 & \underline{c}_N & . & \underline{c}_3 \\ \underline{c}_3 & \underline{c}_2 & \underline{c}_1 & & . & . & & . & . \\ . & . & . & . & . & & & & \underline{c}_N \\ \underline{c}_N & . & & . & \underline{c}_1 & 0 & & & 0 \\ 0 & \underline{c}_N & & & \underline{c}_2 & \underline{c}_1 & 0 & & 0 \\ . & . & & & & \underline{c}_2 & . & & . \\ . & . & & & & . & & & 0 \\ 0 & . & . & 0 & \underline{c}_N & \underline{c}_{N-1} & . & . & \underline{c}_1 \end{bmatrix} \quad (16)$$

of the dimension (M+N−1)×(M+N−1), the following applies with a extended channel pulse response:

$$\underline{x}_E = (\underbrace{\underline{x}_1, \underline{x}_2 \dots \underline{x}_M}_{\underline{x}}, \underbrace{0 \dots 0)^T}_{n-1 \text{ zeroes}} \quad (17)$$

and, moreover, for the received signal $$\underline{e} = \underline{A} \, \underline{x} + \underline{n} \overset{!}{=} \underline{A}_E \, \underline{x}_E + \underline{n}. \quad (18)$$

Because the matrix $\underline{A}_E$ according to Eq. (16) is quadratic, in contrast to the matrix $\underline{A}$ according to Eq. (12), it follows that, for a modified unbiased channel estimator, $$\hat{\underline{x}}_{MOS} = (\underline{A}_E^{*T}\underline{A}_E)^{-1} \underline{A}_E^{*T} \underline{e} = \underline{A}_E^{-1}\underline{A}_E^{*T-1} \underline{A}_E^{*T}\underline{e} = \underline{A}_E^{-1}\underline{e} \quad (19)$$

with the received signal $\underline{e}$ according to Eq. (18). The modified unbiased channel estimator according to Eq. (19) is thus characterized by an estimation matrix $\underline{A}_E^{-1}$. The modified channel estimation according to Eq. (19), which is unbiased and in which the received signal $\underline{e}$ according to Eq. (18) is multiplied by the estimation matrix $\underline{A}_E^{-1}$, can be less expensive implemented because the matrix $\underline{A}_E^{-1}$ is constructed to circulate to the right, as a cyclical correlation of the received signal $\underline{e}$ according to Eq. (18) or Eq. (12) with the elements $\underline{W}_{1,i}$, with i=1 . . . M+N−1 in the first line of the estimation matrix $\underline{A}_E^{-1}$ (FIG. 5). Because the (M+N−1) coefficients $\underline{t}_i = \underline{W}_{1,i}$ of the cyclical correlation gate according to FIG. 5 are a function of both of the expanded transmitted pulse $\underline{c}$ according to Eq. (2) and the number M of observed range gates, in contrast to the signal-adapted filtering according to Eq. (13), the modified unbiased channel estimation according to Eq. (19) utilizes not only the a priori knowledge about the transmitted expanded pulse $\underline{c}$, but also about the number M of observed range gates, and thus the maximum range of interest of the radar channel.

For a matrix $\underline{A}_E$ that circulates to the right, the transformation matrix T, which transforms the matrix $\underline{A}_E$ into a diagonal matrix, is the matrix $$\underline{T} = \underline{T}_{DFT} = [e^{-j2\pi(r-1)(l-1)/(M+N-1)}], \quad r,l=1 \dots M+N-1 \quad (20)$$

of the discrete Fourier transformation (DFT).

With $\underline{T}_{DFT}$ in accordance with Eq. (20) and the discrete Fourier-transformation $$\underline{\lambda} = \underline{T}_{DFT}(\underline{c}_1, \underline{c}_2 \dots \underline{c}_N, 0 \dots 0)^T = \underline{T}_{DFT} \, \underline{c}_E \quad (21)$$

of the expanded transmitted pulses $\underline{c}$ extended by (M−1) zero elements, the matrix $\underline{A}_E$ in accordance with Eq. (16)

$$\underline{A}_E = \frac{1}{M+N-1} \underline{T}^*_{DFT}\underline{\Lambda}\underline{T}_{DFT}, \quad (22)$$

which circulates to the right, is transformed into the diagonal matrix $$\underline{\Lambda} = \text{diag}(\lambda_1, \lambda_2 \dots \lambda_{M+N-1}) = \text{diag}(\underline{\lambda}). \quad (23)$$

With Eq. (22) and the relationship $$\underline{T}_{DFT}^* = \underline{T}_{DFT}^{*T} = \underline{T}_{DFT}^{-1} \cdot (M+N-1), \quad (24)$$

which applies for the unitary matrix $\underline{T}_{DFT}$ in accordance with Eq. (20), it follows for the representation of the unbiased channel estimation and is equivalent to Eq. (19) in frequency range that

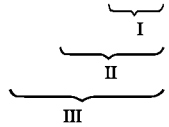

$$\hat{\underline{x}}_{MOS} = \underline{A}_E^{-1}\underline{e} = \underbrace{\underline{T}_{DFT}^{-1}\underbrace{\underline{\Lambda}^{-1}\underbrace{\underline{T}_{DFT}\underline{e}}_{I}}_{II}}_{III}. \quad (25)$$

Figure 6:
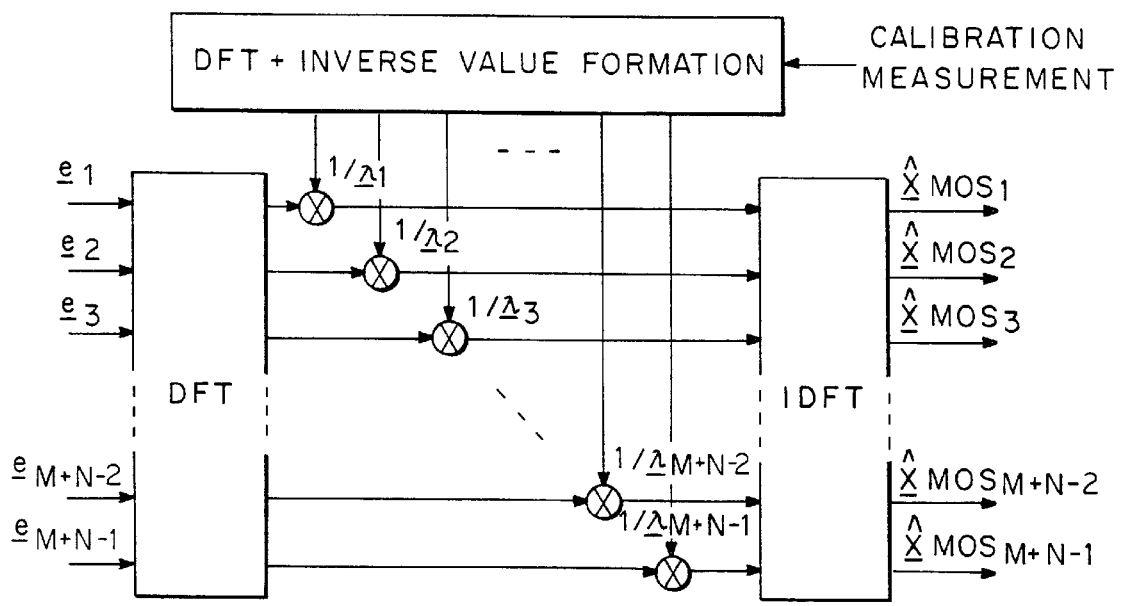
FIG. 6 is a block diagram of an implementation of the unbiased modified channel estimation in accordance with the invention.

Thus, the modified unbiased channel estimator as shown in FIG. 6, can be realized in accordance with Eq. (25). In the modified unbiased channel estimation according to Eq. (25) the discrete Fourier-transformed $\underline{T}_{DFT}\underline{e}$ of the received signal $\underline{e}$ according to Eq. (18) or (12) is formed in a first step I. In a second step II, the actual channel estimation, the unbiased estimation $$\underline{\Lambda}^{-1}\underline{T}_{DFT} \, \underline{e} = \underline{T}_{DFT}\underline{x}_E + \underline{\Lambda}^{-1}\underline{T}_{DFT}\underline{n}, \quad (26)$$

of the discrete Fourier-(DF)-transformed $\underline{T}_{DFT}\underline{x}_E$ of the extended channel impulse response $\underline{x}_E$ in accordance with Eq. (17) is determined with the received signal $\underline{e}$ according to Eq. (18) or (12) and $\underline{\Lambda}$ according to Eq. (23) by dividing the ith component of the vector $\underline{T}_{DFT}\underline{e}$ with the ith component $\lambda_i$ of the discrete Fourier-transformed $\underline{\lambda}$ of the extended expanded transmitted pulse $\underline{c}_E$ according to Eq. (21). In a third step III, the unbiased estimation $\hat{\underline{x}}_{MOS}$ of the extended channel impulse response $\underline{x}_E$ according to Eq. (17) is calculated by inverse DF transformation of the estimation $\underline{\Lambda}^{-1}\underline{T}_{DFT} \, \underline{e}$ in accordance with Eq. (26).

Because calibration measurements must be performed in a short-circuited transmitter and receiver at intervals of approximately 1 minute in the observed NR network in order to achieve a dynamic range of 40 to 50 dB, the vector $\underline{\lambda}$ according to Eq. (21) is to be replaced by the DF transformation of the effective expanded pulse measured in the receiver during the calibration measurement in the modified channel unbiased estimation according to FIG. 6. In the implementation of the modified channel unbiased estimation according to FIG. 6, the matrix $\underline{A}_E$ according to Eq. (16) need not be inverted after each calibration measurement; rather, only the DF transformation of the effective extended expanded pulse recorded during the calibration measurement and calculated according to Eq. (21) must be determined.

In accordance with Eq. (25) and FIG. 6, the modified unbiased channel estimator can be embodied for such expanded pulses $\underline{c}$ for which all magnitudes $|\lambda_i|$ (i=1 ... N) of the discrete Fourier-transformation $\underline{\lambda}$ equal $\underline{T}_{DFT}\, \underline{c}_E$ according to Eq. (21) differ from zero.

In physical terms, this means that the discrete Fourier-transformation $\underline{T}_{DFT}\, \underline{x}_E$ of the extended channel impulse response $\underline{x}_E$ according to Eq. (17) can only be estimated in an unbiased manner with those spectral values with which the transmitted, expanded pulse $\underline{c}$ excites the radar channel with non-diminishing energy.

Due to a reflecting object in the radar channel, an unbiased estimate $\hat{x}_{OSi}$ or $\hat{x}_{MOSi}$ is obtained for the reflectivity $x_i$ of this object at the output of a unbiased channel estimator 18. In contrast, systematic errors comparable to correlation sidelobes at the output of a matched filter are a-priori avoided by using unbiased channel estimation. If the additive noise $\underline{n}$ according to Eq. (10) is included in the received signal $\underline{e}$ according to Eq. (12), an additive noise whose power is, however, always greater than the power of the additive noise at the output of a matched filter is obtained at the output of a unbiased channel estimator. Due to the elimination of the correlation sidelobes in unbiased channel estimation, the signal-to-noise ratio (SNR) at the output of the unbiased channel estimator is lower by the SNR degradation $d_{OS}$ or $d_{MOS}$ in comparison to the maximum SNR at the output of a matched filter. Because $$p_{MF}/dB = p_{max}/dB = 10 \lg N \tag{27}$$

applies for the maximum process gain $P_{max/dB}$ of the matched filter for an expanded transmitted pulse $\underline{c}$ of length N, it follows for the process gain of the optimum unbiased channel estimator according to Eq. (14) that:

$$p_{OS}/dB = p_{MF}/dB - d_{OS}/dB \tag{28}$$

and, for the process gain of the modified unbiased channel estimator according to Eq. (19) which can be implemented cost-effectively, $$p_{MOS}/dB = p_{MF}/dB = -d_{MOS}/dB \tag{29}$$

In the interest of attaining a large process gain, in unbiased channel estimation, expanded transmitted pulses $\underline{c}$ must be selected such that the SNR degradation $d_{OS}$ or $d_{MOS}$ in accordance with Eq. (28) or Eq. (29), respectively, is as small as possible. Therefore, an SNR degradation of less than 2 dB is required for the NR network.

For cost-effective generation of the transmitted signal in the radar stations of the NR network, binary phase-coded expanded pulses $\underline{c}$ are exclusively discussed below, i.e., $c_i \in [-1, +1]$, (i=1 ... N). To achieve a range resolution of approximately 2 m, the chip duration $T_c$ equals 14 ns. Moreover, only binary codes $\underline{c}$ of length N equals 16, 32 and 64 are discussed below. Table 1 summarizes the individual points of the requirement profile of the expanded transmitted pulse $\underline{c}$.

TABLE 1

| Modulation Type | binary phase-shift keying |
|---|---|
| Chip Duration | $T_c$ = 14 ns ($\rightarrow \Delta$ r = 2.1 m) |
| Code Length | N = 16, 32 or 64 |
| SNR Degradation | <2 dB |

As explained above, in unbiased channel estimation, systematic estimation errors comparable to the correlation sidelobes in matched filtering are avoided from the outset. The dynamic range achievable in unbiased channel estimation is therefore only limited by the additive noise at the receiver output. Hence, in unbiased channel estimation, expanded transmitted pulses $\underline{c}$ are to be optimized such that the process gains $p_{OS}$ and $p_{MOS}$ are as large as possible, or the SNR degradations $d_{OS}$ and $d_{MOS}$ in equations (28) and (29) are as small as possible.

If the ith element on the mean diagonal of the matrix ($\underline{A}^{*T} \underline{A})^{-1}$ in Eq. (14) is indicated by $r_j$, the SNR degradation $d_{OS}$ of the optimum unbiased channel estimator can be calculated as $$d_{OS}/dB = \max_i [10 \lg (r_i N)] \tag{30}$$

taking into consideration the above explanations. With the DF-transformed $\underline{\lambda}$ of the extended expanded transmitted pulse $\underline{c}_E$ according to Eq. (21), the SNR degradation $d_{MOS}$ of the modified unbiased channel estimator can be calculated as $$d_{MOS}/dB = 10 \lg \left( \sum_{r=1}^{M+N-1} |\gamma_r^2| \frac{1}{(M+N-1)^2} \sum_{l=1}^{M+N-1} \frac{1}{|\gamma_l|^2} \right). \tag{31}$$

It should be kept in mind that both $d_{OS}$ according to Eq. (30) and $d_{MOS}$ according to Eq. (31) are dependent on the expanded transmitted pulse $\underline{c}$ according to Eq. (2) and the number M of observed range gates. Extensive tests have shown, however, that the influence of the parameter M on the SNR degradations $d_{OS}$ and $d_{MOS}$ according to equations (30) and (31), respectively, is small enough to be disregarded if M>>holds. Furthermore, the SNR degradation $d_{MOS}$ of the modified, less expensive unbiased channel estimator is always greater than the SNR degradation $d_{OS}$ of the optimum unbiased channel estimator.

Figure 7A:
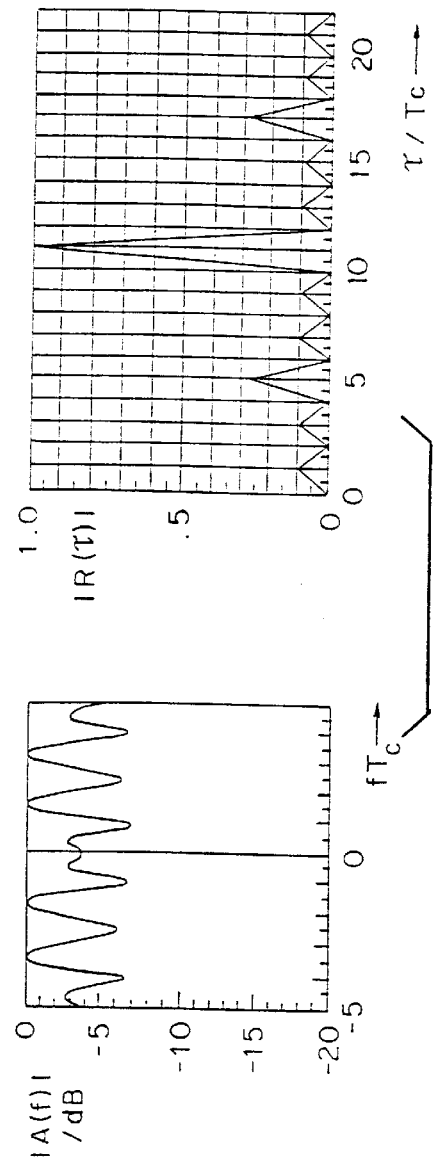
FIGS. 7(a) and (b) are graphs in which the magnitude $|\underline{A}(f)|$ of a code spectrum $\underline{A}(f)$ and the magnitude $|\underline{R}(\tau)|$ of an auto-correlation function $\underline{R}(\tau)$ of two binary codes are shown on the ordinate, and f.$T_c$ or $\tau/T_c$ is shown on the abscissa.
Figure 7B:
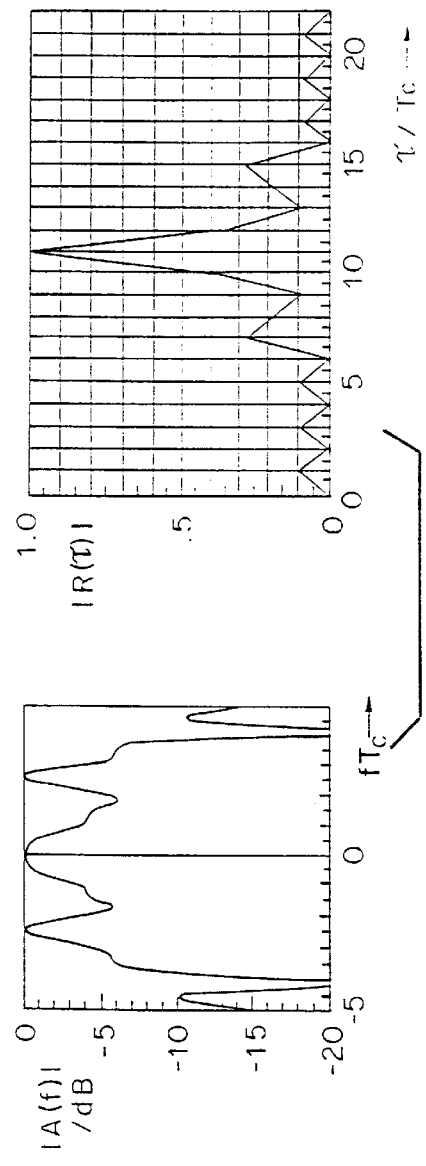

For suitable binary codes that meet the requirement profile according to Table 1, on the one hand, and with which low SNR degradations $d_{MOS}$ and $d_{OS}$ can be achieved, on the other hand, first an explanation is given for the SNR degradation $d_{MOS}$, using Eq. (31) as a point of departure. In accordance with Eq. (31), the SNR degradation $d_{MOS}$ is exclusively determined by the magnitudes $|\lambda_i|$ of the elements $\lambda_i$ (i=1 ... M+N-1) of the DF-transformed $\underline{\lambda}$ of the extended expanded transmitted pulse $\underline{c}_E$ according to Eq. (21), with the lower-quantity values $\lambda_i$ yield the largest contribution to the SNR degradation $d_{MOS}$. Taking into consideration the relationship $$\underline{\lambda}_i = \underline{A}\left( f = \frac{i-1}{T_c(M+N-1)} \right) \tag{32a}$$

with $$\underline{A}(f) = \sum_{i=1}^{N} c_i \exp(-j2\pi fT_c[i-1]), \quad (32b)$$

the large contribution of the small values $|\lambda_i|$ to the SNR degradation $d_{MOS}$ according to Eq. (31) becomes apparent using the estimator structure in FIG. 6, because the unbiased channel estimator according to FIG. 6, as the inverse filter for the DF-transformed $\underline{\lambda}$ of the extended expanded transmitted pulse $\underline{c}_E$ according to Eq. (21), has a substantial amplification for spectral values for which $|\lambda_i|$ is small. Corresponding to this amplification, however, the useful signal as well as the noise $\underline{n}$ according to Eq. (10) that is additively superimposed over the received signal $\underline{e}$ are amplified with frequency-selective amplification. FIGS. 7a and 7b illustrate the amounts of the periodic spectra $\underline{A}$ (f) where ($fT_c$=1) according to Eq. (32b), and of the auto-correlation functions $\underline{R}(\tau)$ of two binary codes of length N equals 11, which are suited to different degrees for unbiased channel estimation.

Although the ratio of the main correlation peak to the largest correlation sidelobes (peak-to-sidelobe ratio PSR) is equal for the auto-correlation functions of both binary codes, the SNR degradations $d_{MOS}$ differ greatly. whereas the SNR degradation $d_{MOS}$ according to Eq. (31) is only 0.93 dB with the binary code according to FIG. 7a, the binary code according to FIG. 7b is unsuitable for unbiased channel estimation, because of the SNR degradation $d_{MOS}$ of 17.8 dB. Binary codes $\underline{c}$, which are particularly well-suited for unbiased channel estimation, are therefore distinguished by a particularly constant course of the magnitude $|\underline{A}(f)|$ of the spectrum A(f) according to Eq. (32b).

The simplest method of determining suitable binary codes $\underline{c}$ is a computer-supported search of all possible codes. For a code length of N=16, this type of search of all 65,536 possible binary codes is possible with a powerful mainframe computer. For the further code lengths of N equals 32 and 64, a comprehensive search is no longer possible, so simulations with binary codes that are randomly selected are suggested. In a simulation for determining suitable binary codes with a mainframe computer, the binary codes $\underline{c}$ having the lowest SNR degradation $d_{MOS}$ according to Eq. (31) were determined from binary codes of length N=16 among all 65,536 possible binary codes.

Moreover, for N equals 32 and 64, respectively, one million binary codes were randomly chosen by a random number generator, and the binary code most suitable for channel unbiased estimation because of the lowest SNR degradation $d_{MOS}$ was respectively determined. FIGS. 8(a) to 8(c) lists, in hexadecimal representation, the binary codes of length N equals 16, 32 and 64 that were determined within the scope of a simulation. FIGS. 8(a)–8(c) further show the associated values of the effectiveness measure $d_{OS}$ according to Eq. (30), $d_{MOS}$ according to Eq. (31) and PSR and the magnitude $|\underline{A}(f)|$ of the code spectrum $\underline{A}(f)$ according to Eq. (32b). While the SNR degradations of 1,03 dB and 0.95 dB, respectively, achieved with the binary codes $\underline{c}$ of length N equals 16 and 32 shown in FIG. 8 are clearly less than the maximum permissible SNR degradation of 2 dB according to Table 1, the SNR degradation of 2.2 dB achieved with the binary code of length N equals 64 only approximates the minimum requirement according to Table 1.

In FIG. 8(a) the code length N=16; the measures of effectiveness are $d_{OS}$=1.02 dB, $d_{MOS}$=1.04 dB, and PSR= 18.10 dB. The hexadecimal representation is 2 8 3 3.

In FIG. 8(b) the code length N=32; the measures of effectiveness are $d_{OS}$=0.94 dB, $d_{MOS}$=0.96 dB, and PSR= 18.06 dB. The hexadecimal representation is 0 0 F 2 D 5 6 6.

In FIG. 8(C) the code length N=64; the measures of effectiveness are $d_{OS}$=2.13 dB, $d_{MOS}$=2.22 dB, and PSR= 18.06 dB. The hexadecimal representation is 4 8 4 3 B A B 4 E F 8 6 D E 4 B.

An example of conversion of hexadecimal to binary representation for N=16: 2, 8, 3, 3, corresponds to 0010, 1000, 0011, 0011 or --+-, +---, --++, --++.

Extensive tests by Applicant have revealed that an absolute dynamic range of approximately 90 to 100 dB is desirable in the NR network. This absolute dynamic range can be separated into 1. a dynamic range of approximately 50 dB, which is achieved through the application by an STC (Sensitivity Time Control) unit in the amplification of the received signal, and
2. a relative dynamic range within an echo profile of 40 to 50 dB, so that very small objects can also be detected in the vicinity of large objects located in the control region of the NR network.

The STC unit used in the receiver devices of the individual radar stations of the NR network is a time-variable amplifier arrangement with which the influence of the radio-field damping is compensated. Moreover, this STC unit ensures that the signal does not fall below the limiting sensitivity of the receiver, even with very weak echo signals. The regulating voltage of the STC is digitally stored in the receiver, and can thus be used as a priori knowledge in digital, receiver-side signal processing.

The relative dynamic range within an echo profile is defined below as a maximum ratio of the magnitudes of two reflectivities that can be detected from the estimated channel impulse response of the radar channel after radio-field damping compensation. In unbiased channel estimation, because the correlation sidelobes are avoided from the outset, the achievable dynamic range is still limited only by the additive noise, that is, by the SNR degradation $d_{OS}$ or $d_{MOS}$ according to Eq. (30) or (31), with a fixed SNR at the receiver input and a predetermined code length N. Minimal or very low SNR degradations are achieved with the binary codes in FIG. 8, and therefore the binary codes shown in FIG. 8 are particularly well-suited for a receiver concept that includes unbiased channel estimation.

The STC unit implemented in the receiver devices of the radar stations of the NR network is an amplifier unit with time-variable amplification. The regulating voltage of the STC unit is selected such that the influence of the radio-field damping is compensated, that is, echo signals due to reflecting objects near the radar antenna are damped, while echo signals due to reflecting objects at the outer periphery of the control region of the NRN module are amplified. The STC unit is also necessary to prevent the limiting sensitivity of the receiver from not being met. The course of the regulating voltage over time is digitally stored in the receiver. The influence of the STC unit is to be compensated after the received signal has been digitized, regardless of the type of receiver-side signal processing used for channel estimation.

Figure 9:
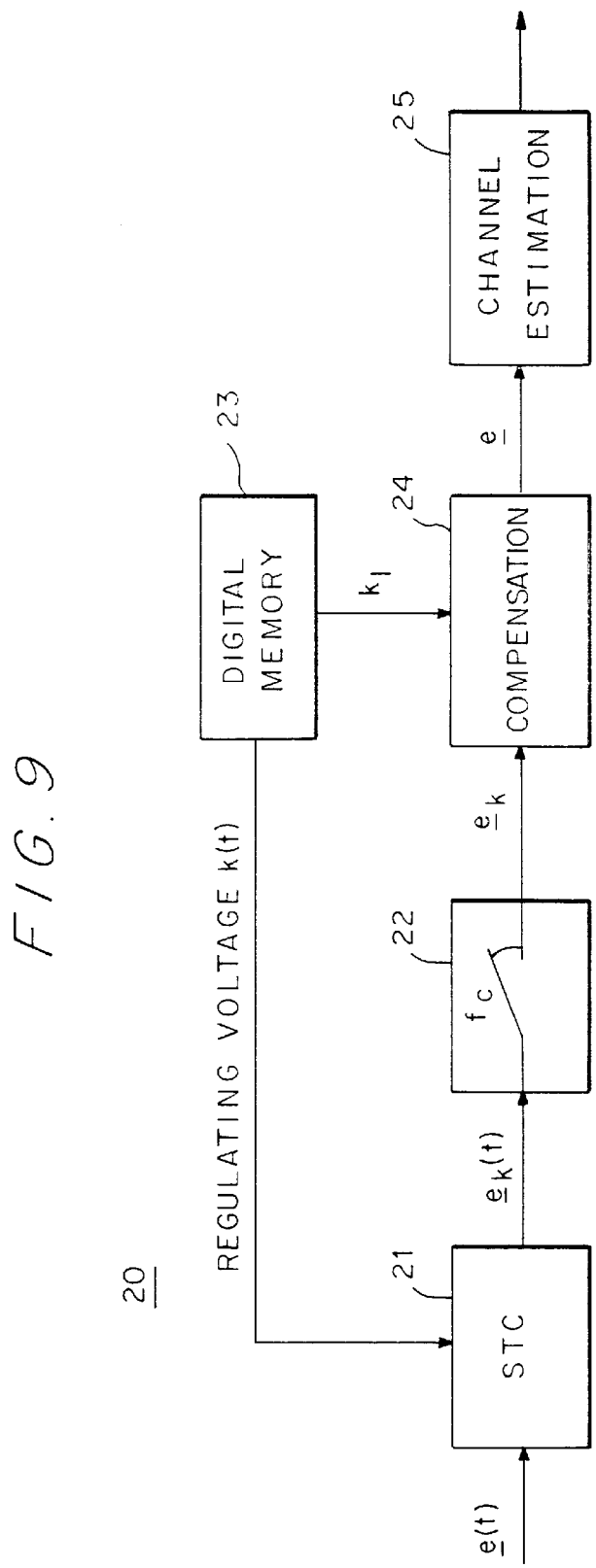
FIG. 9 is a schematic view of a receiving device having an STC unit and a compensation unit.

FIG. 9 shows a receiving device 20 that includes an STC unit 21 and a corresponding compensation device. First, the received signal $\underline{e}(t)$ according to Eq. (7) is supplied to the STC unit 21. The signal $\underline{e}_k(t)$ at the output of the STC unit 21 is amplified in accordance with the time-variable regulating voltage k(t). Because of the desired digital signal processing in the channel estimation, the signal $\underline{e}_k(t)$ is first supplied to a sampling unit 22 with a sampling frequency fc equals $1/T_c$. If the samples $k(iT_c)$ (i=1, . . . , M+N-1) of the regulating voltage k(t) stored digitally in a memory 23 in the receiver 20 are characterized as $k_i$ (i=1, . . . M+N-1), the following is obtained for the vector of the samples of the signal $\underline{e}_k(t)$ using the samples $\underline{e}_i$ (i=1, ... M+N−1) of the received signal $\underline{e}(t)$ according to Eq. (7):

$$\underline{e}_k = (\underline{e}_{k,1}, \underline{e}_{k,2}, \ldots, \underline{e}_{k,M+N-1})^T = (k_1\underline{e}_1, k_2\underline{e}_2, \ldots, k_{M+N-1}\underline{e}_{M+N-1})^T \quad (33)$$

Because the dynamic range in digital signal processing is significantly greater than at the receiver input when the word length of the digitized samples $\underline{e}_{k,1}$ (i=1, ... M+N−1) is sufficiently large, the influence of the STC unit 21 can be compensated again after the signal $\underline{e}_k(t)$ has been digitized. In a compensation device 24 of FIG. 9, the vector $\underline{e}$ according to Eq. (12) is formed from the vector $\underline{e}_k$ according to Eq. (33) in accordance with $$\underline{e} = (\underline{e}_{k,1}/k_1, \underline{e}_{k,2}/k_2, \ldots, \underline{e}_{k,M+N-1}/k_{M+N-1})^T. \quad (34)$$

It can be seen from Eq. (34) that the compensation of the STC unit influence must be performed independently of the type of receiver-side signal processing for channel estimation. The actual channel estimation is then performed in a channel estimator 25.

If an expanded transmitted pulse a(t) having a carrier frequency $f_0$ is reflected by a moving target with radial velocity $v_r$ with respect to the radar antenna, the carrier frequency of the reflected echo signal is shifted by the Doppler frequency $$f_d = \frac{2v_r f_0}{c_0} \quad (35)$$

where $c_0$ is the light speed. The carrier frequency of the expanded transmitted pulse reflected by a moving target is increased by the Doppler frequency $f_d$ according to Eq. (35) if the target moves towards the radar antenna, and is decreased by the Doppler frequency $f_d$ if the target moves away from the radar antenna. Due to the Doppler frequency $f_d$ the reflectivities $\underline{x}_i$ are time-variant, i.e.

$$\underline{x}_i(t) = \underline{x}_i e^{j2\pi f_{di} t} = \underline{x}_i e^{j\frac{4\pi v_{ri} f_0 t}{c_0}}, i = 1 \ldots M. \quad (36)$$

According to Eq. (36), the argument $\arg(\underline{x}_i(t))$ of the complex reflectivity $\underline{x}_i(t)$ changes with time t due to the Doppler frequency $f_{di}$, while the magnitude $|\underline{x}_i|$ of the complex reflectivity $\underline{x}_i(t)$ can be assumed to be time-invariant for the duration of the reflection, that is, for the duration $NT_c$ of the expanded transmitted pulse a(t).

If moving targets are within the control region of an NR network module, the received signal at the associated radar stations equals the sum of time-shifted and Doppler-shifted versions of the expanded transmitted pulse a(t) that have been weighted with the complex reflectivities $\underline{x}_i$. However, because the optimum unbiased channel estimator characterized by the estimation matrix $(\underline{A}^{*T}\underline{A})^{-1}\underline{A}^{*T}$ according to Eq. (14) approximates the received signal by means of a sum of time-shifted and weighted versions of the transmitted, non-Doppler-shifted, expanded pulse $\underline{c}$ in the sense of the least squared errors, the estimation $\hat{\underline{x}}_{OS}$ according to Eq. (14) at the output of the optimum unbiased channel estimator, or the estimation $\hat{\underline{x}}_{MOS}$ according to Eq. (19) at the output of the modified unbiased channel estimator, is no longer unbiased for a Doppler-shifted received signal.

The minimum ratio of the expectation $E[|\hat{\underline{x}}_{OSi}|]$ of the magnitude $|\hat{\underline{x}}_{OSi}|$ of the estimation value $\hat{\underline{x}}_{OSi}$ and the maximum systematic error $\max(E[|\hat{\underline{x}}_{OSr}|])$ (r≠i) is inserted in the logarithmic argument $$v(f_d)/dB = 20 \lg \left( \min_i \frac{E[|\hat{\underline{x}}_{OSi}|]}{\max_{r \neq 1} (E[|\hat{\underline{x}}_{OSr}|])} \right) \quad (37)$$

as a measure of effectiveness $v(f_d)$ for evaluating the systematic errors due to an individual moving target having the complex reflectivity $\underline{x}_i e^{j2\pi f_{di} t}$ according to Eq. (36) at the output of a unbiased channel estimator. The measure of effectiveness $v(f_d)$ according to Eq. (37), which is comparable to the PSR of the correlation function at the output of a signal-adapted filter, is a direct measure for the maximum relative dynamic range achievable with large SNR. The transmitted, expanded pulse a(t) according to Eq. (3) should now experience a Doppler shift during reflection by a moving target in the control region of an NR network module, the Doppler shift being unknown in the receiver. Doppler shifts $f_d$ in an interval of −2000 Hz≦$f_d$≦2000 Hz are to be expected. For reasons of symmetry, Doppler frequencies in a range of 0≦$f_d$≦2000 Hz are discussed below. Moreover, only the optimized binary codes of length N equals 16, 32 and 64 shown in FIG. 8 are discussed.

Figure 10A:
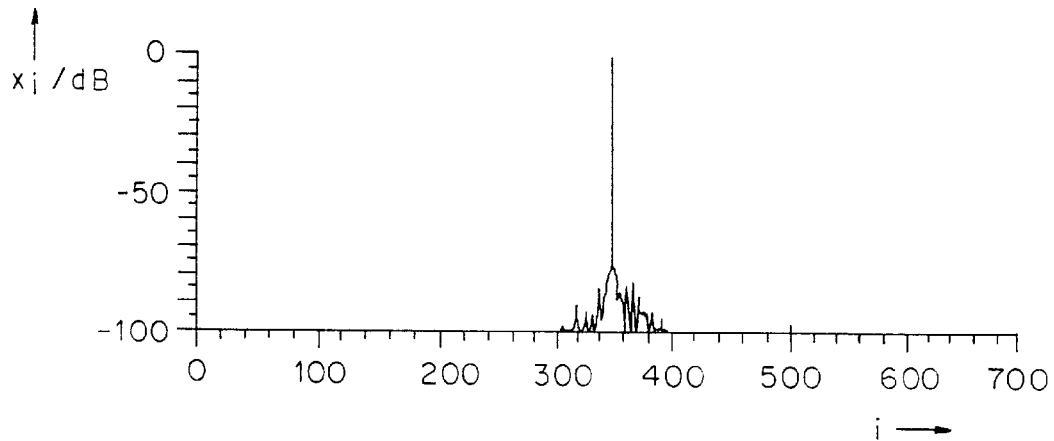
FIGS. 10(a) to 10(c) are graphs showing respectively, the magnitude $|\hat{\underline{x}}_{OS}|$ of estimated impulse responses $\hat{\underline{x}}_{OS}$ in a Doppler shift wherein respectively a) $f_d$ equals 500 Hz, b) $f_d$ equals 1000 Hz, c) $f_d$ equals 2000 Hz.
Figure 10B:
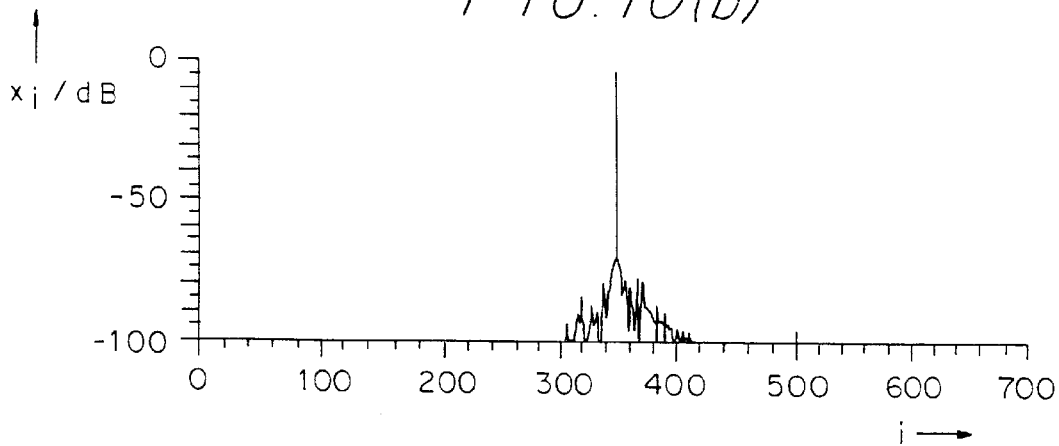
Figure 10C:
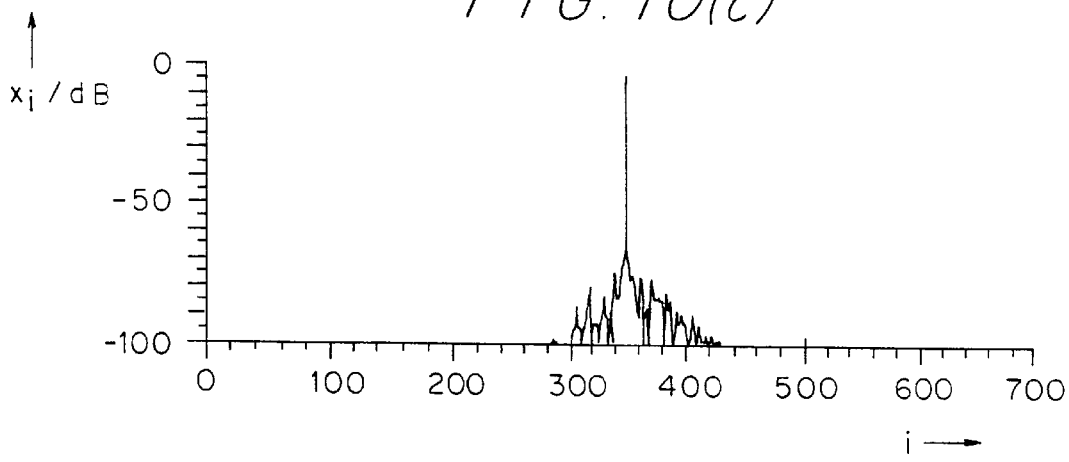

FIGS. 10 (a) through (c) show the magnitude of the estimated channel pulse response $\hat{\underline{x}}_{OS}$ according to Eq. (14) at the output of an optimum unbiased channel estimator for $f_d$ equals 500 Hz, 1000 Hz and 2000 Hz, respectively, with the optimized binary code of length N equals 32 having been selected as the expanded transmitted pulse $\underline{c}$ according to Eq. (2) (M=700 range gates, single target with $|x_i|$=0 dB in the center of the channel). The chip duration $T_c$ equals 14 ns, and the transmitting frequency $f_0$ is 10 GHz. As expected (and apparent from FIGS. 10 (a) through (c)), the systematic estimation errors increase as the Doppler shift $f_d$ increases (FIG. 10).

Figure 11:
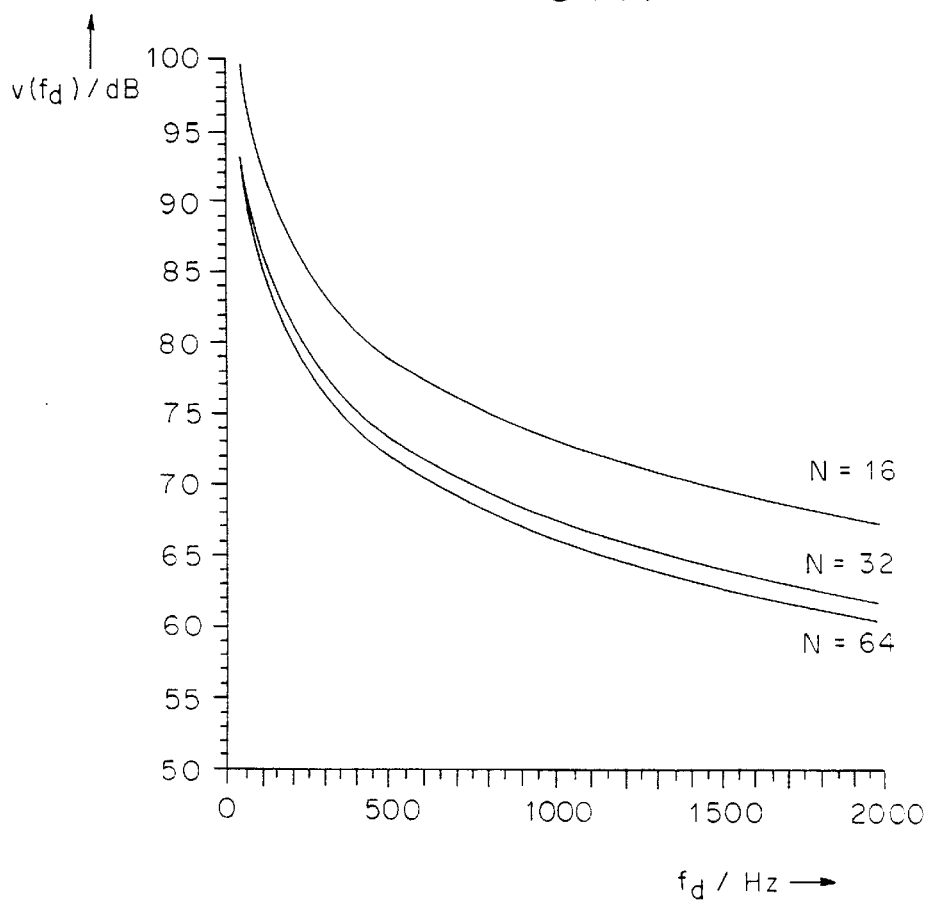
FIG. 11 is a graph in which an effectiveness measure $v(f_d)$ is shown as a function of a Doppler shift $f_d$ for optimized binary codes of specific length, the shift being shown on the abscissa.

The quotient $v(f_d)$, which is a direct measure for the relative dynamic range that can be achieved within an echo profile with large SNR, was introduced in Eq. (37) as a measure of effectiveness for evaluating the systematic estimation errors at the output of an unbiased channel estimator with differing Doppler shifts $f_d$. FIG. 11 shows the measure of effectiveness $v(f_d)$ in dB according to Eq. (37), which is shown over the Doppler shift $f_d$ in Hz for the optimized binary codes of length N equals 16, 32 and 64.

The product $N \cdot T_c \cdot f_d$ of the pulse duration $N \cdot T_c$ and the Doppler shift $f_d$ is decisive for the influence of a Doppler shift $f_d$. This product is a measure for the phase rotation over the pulse duration $N \cdot T_c$ due to the Doppler shift $f_d$. With a predetermined chip duration of $T_c$ equals 14 ns and a fixed Doppler shift $f_d$, therefore, the measure of effectiveness $v(f_d)$ according to Eq. (37) decreases with an increasing code length N (FIG. 11). It is critical, however, to establish that, with the anticipated Doppler shifts $f_d$ of up to 2000 Hz, with the optimized binary codes, the relative dynamic range that can be achieved with large SNR with unbiased estimation is significantly greater than the required relative dynamic range of 50 dB.

The algorithms discussed at the outset for use in channel unbiased estimation are digital signal-processing algorithms. Therefore, the quadrature components $e_I(t)$ and $e_Q(t)$ of the received signal $\underline{e}(t) = e_I(t) + j\, e_Q(t)$ according to Eq. (7) are first sampled at a sampling frequency $f_c$ in the receiver of each radar station. The scanning values $\underline{e}_i$ of the received signal $\underline{e}(t)$ are subsequently subjected to a quantization $$Q(\underline{e}_i) = \underline{w}_i = w_{Ii} + w_{Qi}, i=1 \ldots M+N-1. \quad (38)$$

Because of the simple implementation option, the equidistant rectangular quantization scheme is discussed below; in the quantization, the scanning values $e_{Ii}$ and $e_{Qi}$ of the quadrature components $e_I(t)$ and $e_Q(t)$ of the received signal $\underline{e}(t)$ according to Eq. (7) are supplied to two $M_R$-stage quantizers of the same type, having quantization word lengths $m_e$/bit equals $1d(M_R)$ and whose transmission behavior has a zero-point-symmetrical characteristic curve with equidistant threshold spacing.

Figure 12:
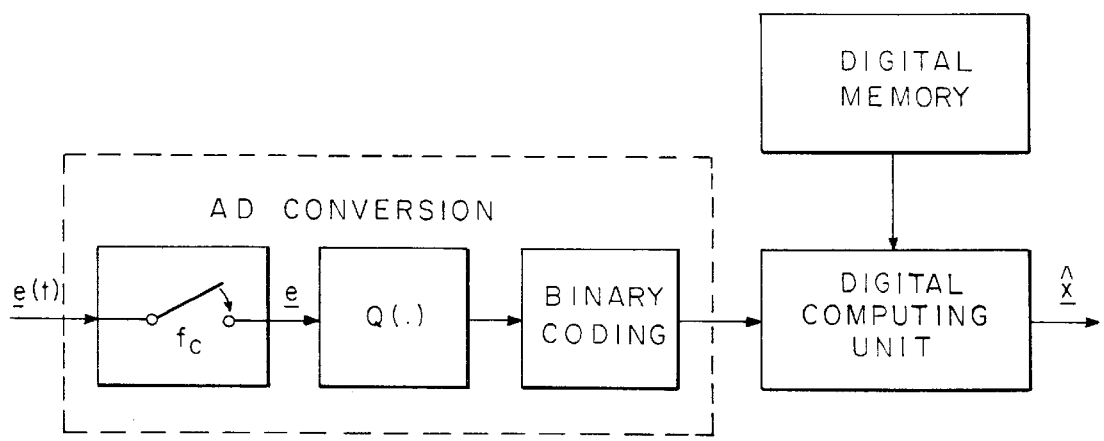
FIG. 12 is a block diagram of a basic structure of a receiver of a digital system using unbiased channel estimation.

In a digital system, the quantized samples $Q(\underline{e}_i)$ according to Eq. (38) are represented by binary code words of length $m_e$/bit. The signal-processing steps, sampling, quantization and binary coding, together are characterized as analog-digital conversion. In addition to the samples $\underline{e}_i$ of the received signal $\underline{e}(t)$ according to Eq. (7), however, the elements of the estimation matrix that characterizes a channel estimator in its entirety, where the estimator is unbiased, are only stored in a digital memory with a finite word length $m_M$/bit. The basic structure of the receiver of a digital system using unbiased channel estimation according to FIG. 12 is discussed below.

A microprocessor or a Digital Signal Processor (DSP) whose internal word length is clearly greater than the word lengths $m_e$ or $m_M$ can be used as the digital computing unit in which the actual channel estimation is performed. With decreasing word lengths $m_e$ or $m_M$, the channel estimations $\hat{\underline{x}}_{OS}$ or $\hat{\underline{x}}_{MOS}$ according to Eq. (14) or (19), respectively, are increasingly adulterated by the quantization error. A small word length $m_e$ of the receiver-side AD converter is, however, advantageous since the complexity of an AD converter increases significantly with an increasing word length. Furthermore, a small word length $m_M$ is advantageous because the size of the digital memory necessary for storing the estimation matrix and the necessary data transfer between the digital memory and the digital computing unit during channel estimation increase.

The quotient of the square of the reflectivity of largest magnitude $\max(|\underline{x}_i|)^2$ and the expected value of the average quadratic deviation $1/M \, \|\hat{\underline{x}}_{OS} - \underline{x}\|^2$ between the channel estimation $\hat{\underline{x}}_{OS}$ and the true channel pulse response $\underline{x}$ is inserted in the logarithmic argument $$V/dB = 10 \, lg \frac{\max_i (|\underline{x}_i|)^2}{E\left(\frac{1}{M} \|\hat{\underline{x}}_{OS} - \underline{x}\|^2\right)} \quad (39)$$

as a global measure of effectiveness for evaluating the estimation error $\hat{\underline{x}}_{OSi} - \underline{x}_i$ that increases with decreasing word length $m_e$ and $m_M$. The measure of effectiveness V according to Eq. (39) is a measure for the relative dynamic range that is achievable within an echo profile as a function of the word lengths $m_e$ and $m_M$ in a noiseless case.

Figure 13A:
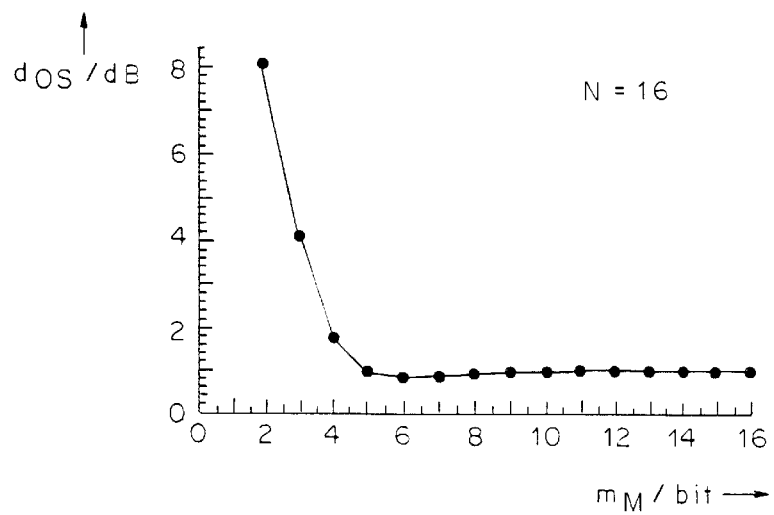
FIGS. 13(a) to 13(c) are graphs in which an SNR degradation $d_{OS}$ is shown on the ordinate as a function of the word length $m_M$, shown on the abscissa, of quantized elements of the estimation matrix of an optimum channel unbiased estimator for binary codes of differing code lengths N.
Figure 13B:
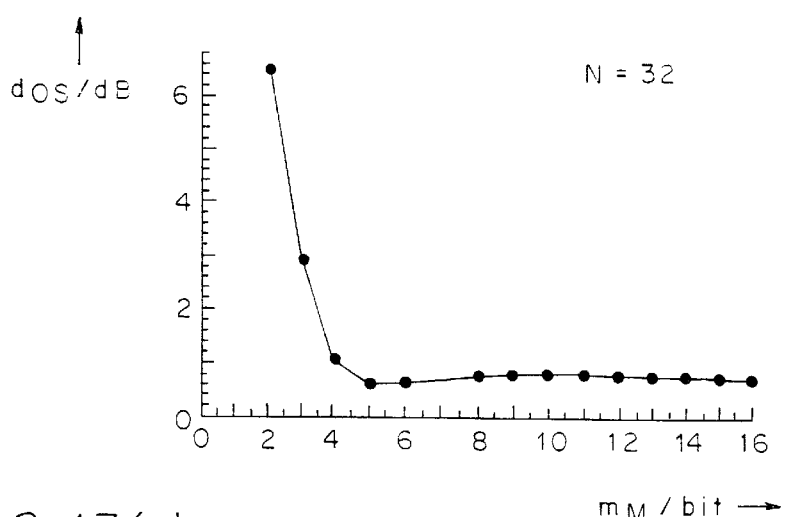
Figure 13C:
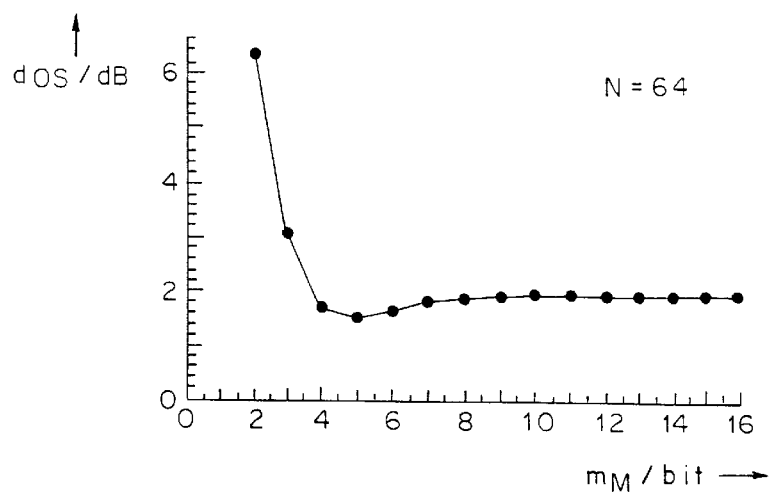

FIGS. 13a through c show the SNR degradation $d_{OS}$ of an optimum unbiased channel estimator over the word length $m_M$/bit for the optimized binary codes of length N equals 16, 32 and 64. The curves shown in FIG. 13 show that, for typical word lengths of fast digital memories of, for example, $m_M=8$ bits, the influence of the word length $m_M$ of the quantized elements of the estimation matrix $(\underline{A}^{*T}\underline{A})^{-1} \underline{A}^{*T}$ of an optimum unbiased channel estimator on the SNR degradation $d_{OS}$ is negligible, regardless of the binary code used.

Figure 14A:
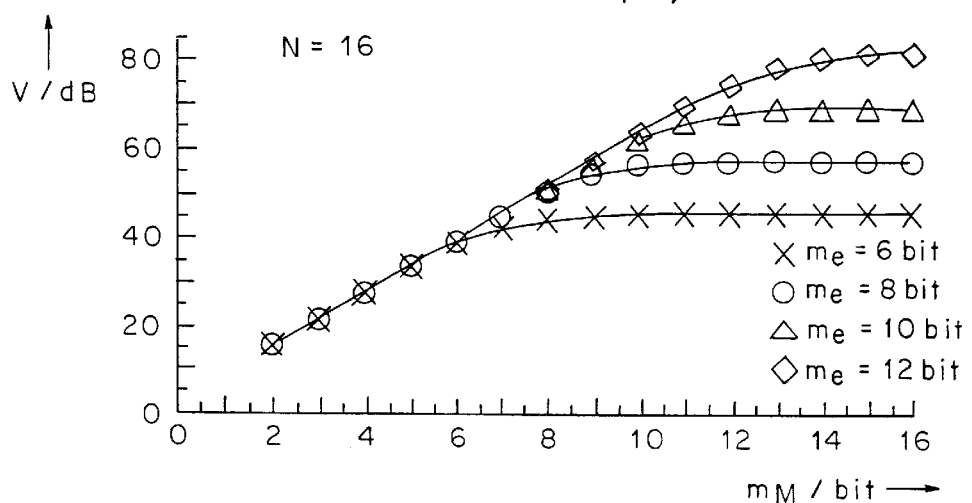
FIGS. 14(a) to 14(c) are graphs in which an effectiveness measure V for optimized binary codes of a specific length N is shown on the ordinate as a function of a wordlength $m_M$ for different wordlengths $m_e$, the former being shown on the abscissa.
Figure 14B:
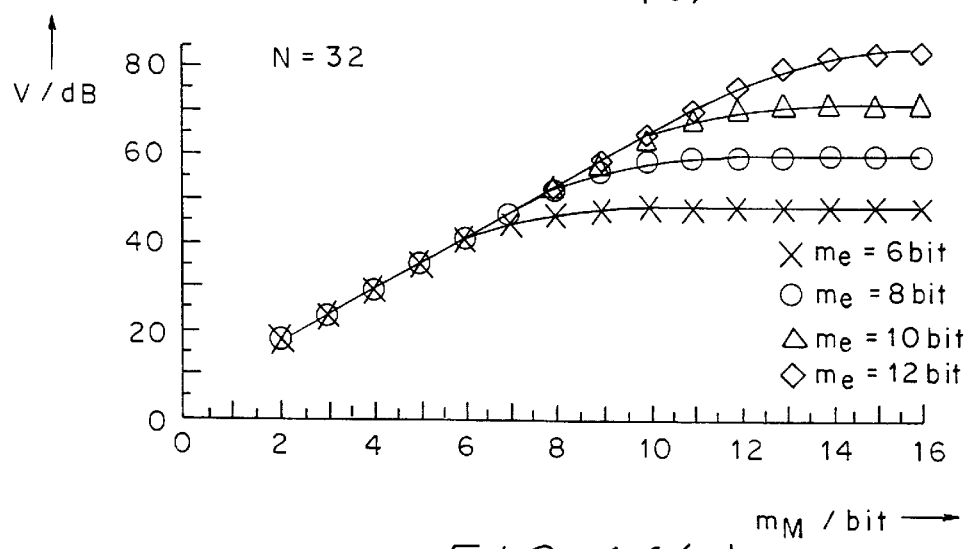
Figure 14C:
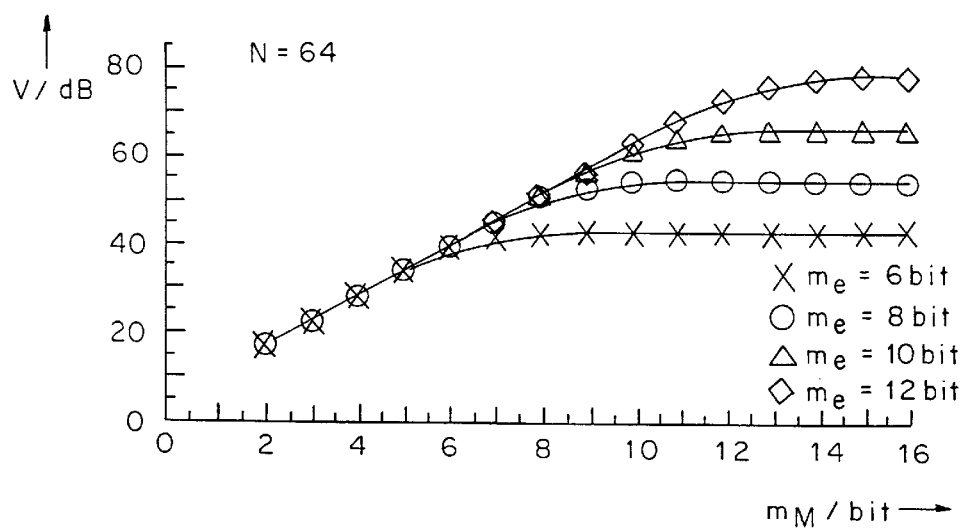

FIGS. 14a through 14c again show the measure of effectiveness V according to Eq. (39) for the optimized binary codes of length N equals 16, 32 and 64 for different word lengths $m_e$. FIGS. 14a through 14c show that, for $m_M < m_e$, an increase in the dynamic range of 6 dB/bit is achieved with increasing word length $m_M$. An optimum estimation dynamic range is achieved if $m_M$ is selected to be equal to $m_e$, because for $m_e > m_M$, the estimation errors limit the estimation dynamic range because of the finite word length $m_M$, and with word lengths of $m_M > m_e$, no increase in the estimation dynamic range can be achieved. To be able to achieve the required relative dynamic range of 40 to 50 dB with large, SNR at the receiver input both the word length $m_e$ and the word length $m_M$ must be selected to be greater than 8 bits.

Tests performed by Applicant have shown that, in the noise-free case, the required relative dynamic range of 40 to 50 dB can be achieved by unbiased optimum channel estimation even under consideration of maximum Doppler shifts of 2000 Hz to be expected in the NR network, and with a suitable selection of the word lengths used for digital signal processing. The relative dynamic range that is actually achieved in real, noise-afflicted operation of the individual radar stations in FIG. 1 is thus determined only by the additive noise at the estimator output, or by the process gain in receiver-side signal processing.

With the above-described NR network, a target having a radar cross section of 1 m² can be detected in a range of 1000 m with a transmitting power of 1 W. with consideration of the antenna gain, the noise factor of the receiver antenna, possible atmospheric damping, etc., in the above-described scenario the SNR at the receiver input is approximately 25 dB. Target detection is therefore only possible if, in the receiver-side signal processing, a process gain p of at least 25 dB is achieved. The process gain p that can be achieved through the receiver-side signal processing is the sum of the process gain $p_{OS}$ of the unbiased channel estimator and a process gain $p_i$ achieved through coherent pulse integration in accordance with $$p/dB = p_{OS}/dB + p_i/dB \stackrel{!}{=} 25 \text{ dB}. \quad (40)$$

With equations (27) and (28) and the SNR degradation $d_{OS}$ according to FIG. 8 the process gains $p_{OS}$ listed in Table 2 result for the optimized binary codes of length N equals 16, 32 and 64.

TABLE 2

|  | N = 16 | N = 32 | N = 64 |
|---|---|---|---|
| $p_{os}$/dB | 11.02 | 14.11 | 15.93 |

A coherent integration at the input of the channel estimator is advantageous with respect to a possible low computational complexity for unbiased channel estimation. Each radar station should transmit binary phase-coded, expanded pulses of the duration $N \cdot T_c$ at time intervals $T_r$, with $T_r \gg N \cdot T_c$.

The process gain $p_i$ achievable through coherent integration is defined as the ratio of the SNR $\gamma_{aK}$ at the output of the channel estimator after K integration steps to the SNR $\gamma_{a1}$ at the output of the channel estimator without coherent integration; i.e.

$$p_i/dB = 10 \, lg \left(\frac{\gamma_{aK}}{\gamma_{a1}}\right). \quad (41)$$

In a time-variant radar channel, the process gain $p_i$ according to Eq. (41) thus increases in accordance with $$p_i/dB|_{f_d=0} = 10 \, lg \, K \quad (42)$$

with an increasing number K of integration steps. Theoretically, in a time-invariant radar channel, an arbitrarily high process gain $p_i$ according to Eq. (41) can be attained through coherent integration according to Eq. (42).

In contrast, in a radar channel that is time-variant due to moving objects in the control field of the NR network, the process gain that can be achieved is always smaller than the process gain according to Eq. (42), that is, $$p_i/dB|_{f_d=0} < 10 \lg K \quad (43)$$

because, due to the non-diminishing Doppler shifts, the phases of the respective useful signal components to be integrated are not equal, so no completely constructive superimposing occurs.

The product $f_{dmax} \cdot T_r$ of the maximum Doppler shift $f_{dmax}$ and the pulse repetition time $T_r$ has a significant influence on the maximum process gain $p_{imax}$ that can be achieved through coherent integration. The smaller $f_{dmax} \cdot T_r$ is, the larger the process gain $p_{imax}$. Because the maximum Doppler shift to be expected in the considered NR network equals 2000 Hz, the selection of the pulse repetition time $T_r$ is of considerable significance.

If $T_r$ is selected to be small, a large process gain $p_i$ can be achieved through coherent integration, on the one hand, but, on the other hand, a serious overshoot problem arises in the receiver. The overshoot problem lies in the fact that, during the active time interval of the receiver, not only echo signals due to the expanded pulse transmitted immediately before, but also echo signals from reflecting objects in the overshoot range due to expanded pulses not transmitted immediately before are received.

The overshoot problem is solved naturally if the pulse repetition time $T_r$ is selected to be so large that echo signals of reflecting objects in the overshoot range due to an expanded transmitted pulse also decay before the successive expanded transmitted pulse is transmitted. In the NR network, reflecting objects up to a maximum range of 4500 m are considered relevant. If the pulse repetition time $T_r$ is at least equal to 30 μs, the overshoot is no longer significant.

Figure 15:
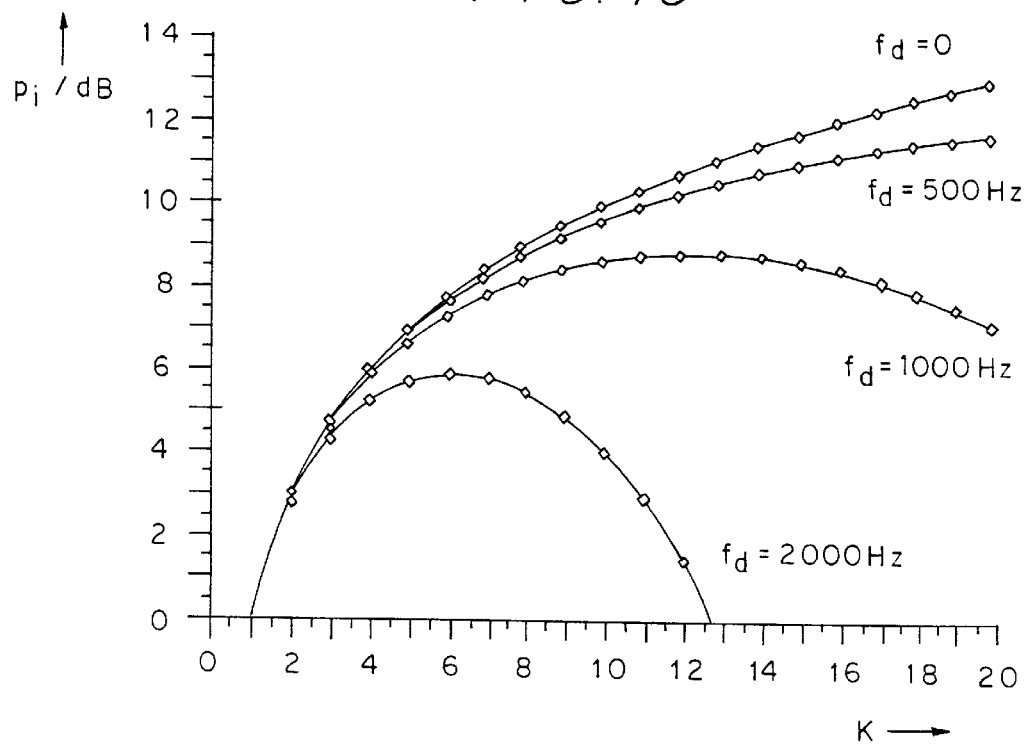
FIG. 15 is a graph in which a process gain $p_t(dB)$ is shown on the ordinate as a function of a number K of integration steps for different Doppler shifts, the number being shown on the abscissa.

The maximum process gain $p_{imax}$ that can be achieved through coherent integration, and the number $K_{opt}$ of the integration steps necessary to achieve $p_{imax}$, have been determined with the simulation results as a function of the parameters $f_d$ and $T_r$, with only the optimized binary code of length N=32 being considered. The influence of the code length N on the results shown in FIG. 15 is, however, negligible, because $N \cdot T_c << T_r$. In FIG. 15 the process gain $p_i$ for $T_r$=30 μs is shown as a function of the number K of integration steps for different Doppler shifts $f_d$. As the Doppler shift $f_d$ becomes smaller, however, the maximum process gain $p_{imax}$ achievable through coherent integration and the number $K_{opt}$ of the integration steps necessary to achieve $p_{imax}$ increases.

Figure 16:
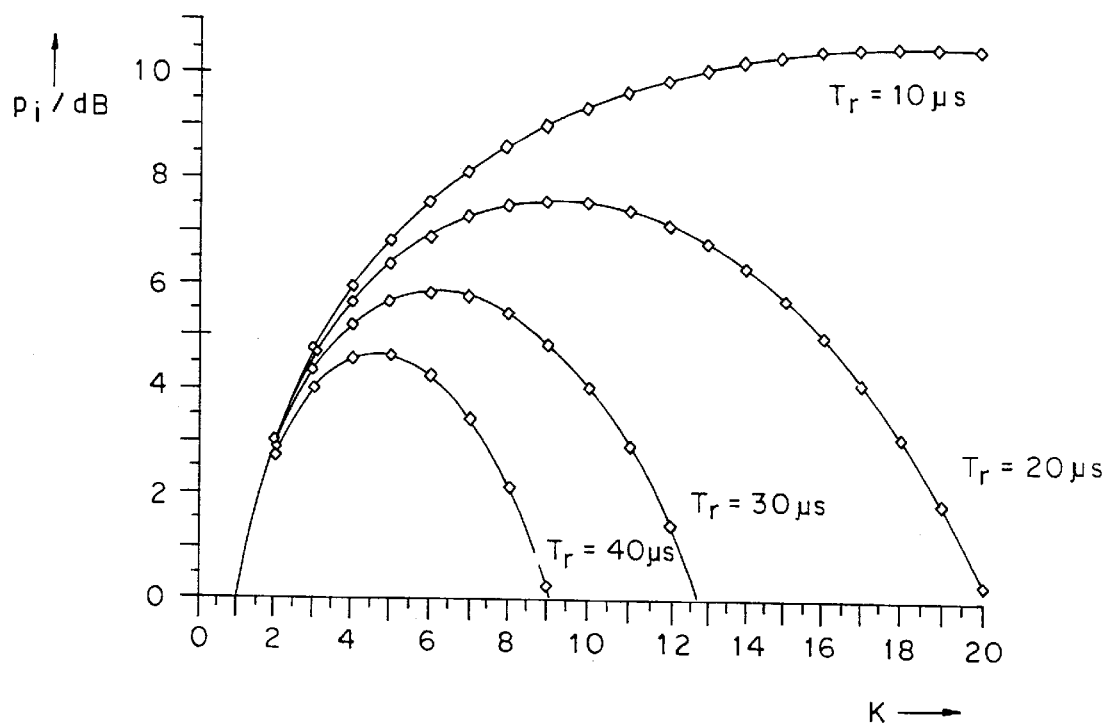
FIG. 16 is a graph in which the process gain $p_t(dB)$ is shown as a function of a number K of integration steps for different pulse repetition durations $T_r$, the number being shown on the abscissa.

In FIG. 16, the process gain $p_i$ is again depicted for different values of the pulse repetition frequency $T_r$ versus the number K of integration steps, with the selection of the frequency shift $f_d$=2000 Hz. It can be inferred from FIG. 16 that the maximum achievable process gain $p_{imax}$ increases with a decreasing pulse repetition time $T_r$; however, an overshoot can occur in the receiver for $T_r$<30 μs.

The maximum process gain $p_{imax}$ attainable through coherent integration and the optimum number $K_{opt}$ of integration steps necessary for attaining $p_{imax}$ for different values of the considered parameters are listed in Table 3.

TABLE 3

| $T_r/\mu s$ | $f_d/Hz$ | $p_{imax}/dB$ | $K_{opt}$ |
|---|---|---|---|
| 30 | 500 | 11.87 | 25 |
| 30 | 1000 | 8.87 | 12 |
| 30 | 2000 | 5.90 | 6 |
| 10 | 2000 | 10.62 | 19 |
| 20 | 2000 | 7.63 | 9 |
| 40 | 2000 | 4.66 | 5 |

With the use of the optimized binary code of length N=32 with Eq. (40) and the values listed in Tables 2 and 3, a resulting maximum process gain of 20.01 dB can be achieved with unbiased channel estimation and coherent integration for $T_r$=30 μs and $f_{dmax}$=2000 Hz. To attain the required process gain of 25 dB, either only Doppler shifts of 500 Hz maximum are allowed, or the transmitting power is to be increased to 3.15 W.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. A method for determining a complex impulse response of a high-resolution, band-limited radar channel in a radar station transmitting a binary phase-coded expanded transmitted pulse $\underline{a}(t)$, the method including receiving a complex vector signal $\underline{e}$, expanding the transmitted pulse $\underline{a}(t)$ with respect to bandwidth using a binary complex vector spread code $\underline{c}$ of length N and a chip duration $T_c$, from the received signal $\underline{e}$;

superimposing a complex vector additive interference signal $\underline{n}$;

performing in a time range covering M range gates of interest according to the spread code $\underline{c}$; and modifying the linear optimum estimation by determining a linear optimum unbiased estimation pulse response $\hat{\underline{x}}_{MOS}$ of the band-limited radar channel according to $$\hat{\underline{x}}_{MOS} = \underline{A}_E^{-1} \underline{e}$$

where the step of determining further comprises forming a complex matrix $\underline{A}_E$ by widening of the rectangular matrix represented by the complex scalar components $c_i$ of the spread code $\underline{c}$ to form a quadratic matrix that circulates to the right, forming an inverse estimation matrix $\underline{A}_E^{-1}$ of the matrix $\underline{A}_E$, and multiplying the inverse estimation matrix by the sampled received signal $\underline{e}$ and to modify the linear, optimum estimation in the channel estimator.

2. The method according to claim 1, wherein the step of determining the modified, optimum unbiased channel estimate $\hat{\underline{x}}_{MOS}$ includes:

providing a cyclical, digital correlator in a first line of the inverse estimation matrix $\underline{A}_E^{-1}$ comprising means for cyclical correlation of the received signal $\underline{e}$ having elements $W_{1,i}$, with i=1 ... M+N−1, with the (M+N−1) filter coefficients $\underline{t}_i = W_{1,i}$, wherein the cyclical, digital correlator is a function of both the expanded transmitted pulse spread code $\underline{c}$ and the number M of range gates of interest, whereby a priori knowledge about the number M of range gates of interest and therefore the maximum range of the radar system to be considered is used in addition to the knowledge about the spread code $\underline{c}$.

3. The method according to claim 1, wherein the step of determining the modified, optimum unbiased estimation pulse response $\hat{\underline{x}}_{MOS}$ further comprises three steps: first, calculation of the discrete Fourier spectrum of the received signal $\underline{e}$; second, division of the discrete spectral values of the received signal $\underline{e}$ by discrete spectral values of the effective transmitted signal obtained through a calibration measurement; and third, determination of the modified unbiased estimation $\hat{\underline{x}}_{MOS}$ by means of an inverse discrete Fourier transformation of the estimation value obtained from the division performed in the second step.

4. The method according to claim 3, wherein:

the first step is performed through the formation of the discrete Fourier transformation $\underline{T}_{DFT}\,\underline{e}$ of the received signal $\underline{e}$;

the second step is performed through an actual channel estimation, in which the optimum unbiased estimation $$\underline{\Delta}^{-1}\,\underline{T}_{DFT}\,\underline{e} = \underline{T}_{DFT}\,\underline{x}_E + \underline{\Delta}^{-1}\,\underline{T}_{DFT}\,\underline{n}$$

of the discrete Fourier-transformation $\underline{T}_{DFT}\underline{x}_E$ of the extended channel pulse response $$\underline{x}_E = (\underbrace{\underline{x}_1, \underline{x}_2, \ldots \underline{x}_M}_{\underline{x}}, \underbrace{0 \ldots 0}_{N-1\ \text{zeroes}})^T$$

is determined with the received signal $\underline{e}$ and the diagonal matrix $\underline{\Delta}$ in that the ith component of the vector $\underline{T}_{DFT}\,\underline{e}$ is divided by the ith component $\lambda_i$ of the discrete Fourier-transformation $$\underline{\lambda} = \underline{T}_{DFT}(c_1, c_2 \ldots c_N, 0 \ldots 0)^T = \underline{T}_{DFT}\,\underline{c}_E$$

of the extended, expanded transmitted pulse $\underline{c}_E$, where $$\underline{\Delta} = \operatorname{diag}(\lambda_1, \lambda_2 \ldots \lambda_{M+N-1}) = \operatorname{diag}(\lambda_i),\ i=1, 2 \ldots M+N-1;$$

and the third step is performed through the inverse discrete Fourier transformation $\underline{T}_{DFT}$ of the estimation $$\underline{\Delta}^{-1}\,\underline{T}_{DFT}\,\underline{e} = \underline{T}_{DFT}\,\underline{x}_E + \underline{\Delta}^{-1}\,\underline{T}_{DFT}\,\underline{n},$$

such that the modified, optimum unbiased estimation $\hat{\underline{x}}_{MOS}$ of the extended channel pulse response $\underline{x}_E$ is in the form of $$\hat{\underline{x}}_{MOS} = \underline{A}_E^{-1}\,\underline{e} = \underline{T}_{DFT}^{-1}\,\underline{\Delta}^{-1}\,\underline{T}_{DFT}\,\underline{e}.$$

5. The method according to claim 1, including application of Sensitivity Time Control (STC) by providing an amplifier unit including means for changing amplification over time through a control voltage provided in a receiver such that the control voltage, stored with respect to its course over time, is selected such that an influence of radio-field damping is compensated, and the analog received signal $\underline{e}(t)$ is amplified to a compensated analog received signal $\underline{e}_k(t)$ as a function of the stored control voltage.

6. The method according to claim 5, wherein, after being digitized, analog received signals $\underline{e}_k(t)$ subjected to STC amplification regulation are supplied as digital received signals $\underline{e}_k$ to a compensation device (29) in which the influence of the previous STC amplification is compensated again.

7. The method according to claim 1, including use of a binary code for the spread code and, consequently, of a corresponding binary-coded, phase-shift keying modulation of the transmitted pulses.

8. The method according to claim 7, including a step of selecting the spread code c to achieve a virtually constant course of the magnitude $|\underline{A}(f)|$ of the spectrum according to an equation $$\underline{A}(f) = \sum_{i=1}^{N} c_i \exp(-j2\pi f T_c[i-1]),$$

such that degradation of the signal-to-noise ratio is as low as possible.

9. The method according to claim 1, wherein the vector signal $\underline{e}$ is an analog received signal $\underline{e}(t)$ and time signal quadrature components $e_I(t)$ and $e_Q(t)$ of the analog received signal $\underline{e}(t)$ are formed in a receiver, are sampled at a sampling frequency $f_c = 1/T_c$ of the spread code, and samples $\underline{e}_i$ are subsequently subjected to a quantization $$Q(\underline{e}_i) = \underline{w}_i = w_{Ii} + w_{Qi},\ i=1 \ldots M+N-1.$$

10. The method according to claim 1, comprising providing a microprocessor or a digital signal processor (DSP) whose internal word lengths are significantly greater than a word length $m_e$ or $m_M$, where $m_e$/bit is a quantization word length of the samples of the received signal $\underline{e}$, and $m_M$/bit is a finite word length of the elements of the estimation matrix, and using the microprocessor or digital signal processor as a digital computing unit for channel estimation.

11. The method according to claim 1, including establishing an optimum value of a process gain that can be attained through coherent integration by the product $f_{dmax} \cdot T_r$ where $f_{dmax}$ is a maximum Doppler shift and $T_r$ is a pulse repetition frequency.

12. The method according to claim 1, wherein the radar station is a modular short-range radar (NR) network.

13. The method according to claim 12, including application of Sensitivity Time Control (STC) by providing an amplifier unit including means for changing amplification over time through a control voltage provided in a receiver such that the control voltage, stored with respect to its course over time, is selected such that an influence of radio-field damping is compensated, and the analog received signal $\underline{e}(t)$ is amplified to a compensated analog received signal $\underline{e}_k(t)$ as a function of the stored control voltage.

14. The method according to claim 13, wherein, after being digitized, analog received signals $\underline{e}_k(t)$ subjected to STC amplification regulation are supplied as digital received signals $\underline{e}_k$ to a compensation device (29) in which the influence of the previous STC amplification is compensated again.

15. The method according to claim 12, including use of a binary code for the spread code and, consequently, of a corresponding binary-coded, phase-shift keying modulation of the transmitted pulses.

16. The method according to claim 15, including a step of selecting the spread code c to achieve a virtually constant course of the magnitude $|\underline{A}(f)|$ of the spectrum according to an equation $$\underline{A}(f) = \sum_{i=1}^{N} \underline{c}_i \exp(-j2\pi f T_c[i-1])$$

such that degradation of the signal-to-noise ratio is as low as possible.

17. The method according to claim 12, wherein the vector signal $\underline{e}$ is an analog received signal $\underline{e}(t)$ and time signal quadrature components $e_I(t)$ and $e_Q(t)$ of the analog received signal $\underline{e}(t)$ are formed in a receiver, are sampled at a sampling frequency $f_c = 1/T_c$ of the spread code, and samples $\underline{e}_i$ are subsequently subjected to a quantization $$Q(\underline{e}_i) = \underline{w}_i = w_{Ii} + w_{Qi}, \ i = 1 \ldots M+N-1.$$

18. The method according to claim 12, comprising providing a microprocessor or a digital signal processor (DSP) whose internal word lengths are significantly greater than a word length $m_e$ or $m_M$, where $m_e$/bit is a quantization word length of the samples of the received signal $\underline{e}$, and $m_M$/bit is a finite word length of the elements of the estimation matrix, and using the microprocessor or digital signal processor as a digital computing unit for channel estimation.

19. The method according to claim 12, including establishing an optimum value of a process gain that can be attained through coherent integration by the product $f_{dmax} \cdot T_r$ where $f_{dmax}$ is a maximum Doppler shift and $T_r$ is a pulse repetition period.

* * * * *